United States Patent
Crowder et al.

(10) Patent No.: US 10,067,353 B2
(45) Date of Patent: Sep. 4, 2018

(54) FOIL TENSIONING SYSTEM FOR PEPPER'S GHOST ILLUSION

(71) Applicant: VENTANA 3D, LLC, Van Nuys, CA (US)

(72) Inventors: Ashley Crowder, Venice, CA (US); Benjamin Conway, Santa Monica, CA (US)

(73) Assignee: VENTANA 3D, LLC, Van Nuys, CA (US)

( * ) Notice: Subject to any disclaimer, the term of this patent is extended or adjusted under 35 U.S.C. 154(b) by 0 days.

(21) Appl. No.: 15/065,375

(22) Filed: Mar. 9, 2016

(65) Prior Publication Data
US 2016/0266397 A1    Sep. 15, 2016

Related U.S. Application Data

(60) Provisional application No. 62/130,582, filed on Mar. 9, 2015, provisional application No. 62/130,590, filed on Mar. 9, 2015, provisional application No. 62/130,596, filed on Mar. 9, 2015.

(51) Int. Cl.
*G02B 27/22* (2018.01)
*G03B 21/56* (2006.01)

(52) U.S. Cl.
CPC ......... *G02B 27/2292* (2013.01); *G03B 21/56* (2013.01)

(58) Field of Classification Search
CPC ..... G03B 21/58; G03B 21/56; G02B 27/2292
USPC ........................................................ 359/461
See application file for complete search history.

(56) References Cited

U.S. PATENT DOCUMENTS

| | | | | |
|---|---|---|---|---|
| 3,485,165 A | * | 12/1969 | Hughes | B07B 1/48 101/127.1 |
| 3,785,729 A | | 1/1974 | Dasher et al. | |
| 4,409,749 A | * | 10/1983 | Hamu | B41F 15/36 160/378 |
| 5,809,624 A | | 9/1998 | Nakamae et al. | |
| 6,279,644 B1 | * | 8/2001 | Wylie | E06B 9/52 160/371 |
| 6,318,255 B1 | * | 11/2001 | Larson | B41F 15/36 101/127.1 |

(Continued)

OTHER PUBLICATIONS

International Search Report dated Aug. 8, 2016 in connection with PCT/US2016/021546.

*Primary Examiner* — Christopher Mahoney
(74) *Attorney, Agent, or Firm* — Parker Ibrahim & Berg LLP; James M. Behmke; Stephen D. LeBarron

(57) ABSTRACT

Systems and methods herein are directed to foil tensioning systems for Pepper's Ghost Illusion. In one embodiment, a roller-based foil tensioning system provides for a holographic foil to be secured to a roller system on two or four sides, rolled outwards, and are then bolted in place, tightening the holographic screen material. In another embodiment, a frame-based foil tensioning system provides for the foil to be secured to a frame system on two or four sides, stretched outwards by expansion of the frame's size (e.g., by a screw jack system), and then bolted in place (while tightened). Illustratively, the foil can be secured to a tensioning system (e.g., the roller system, the expanding frame, or any frame that can be pulled apart) in a variety of manners (e.g., locking strips or snaps and a groove, loops and a rod, two rods with a foil loop, etc.).

13 Claims, 29 Drawing Sheets

(56) References Cited

U.S. PATENT DOCUMENTS

| | | | |
|---|---|---|---|
| 7,936,505 B2 * | 5/2011 | Enochs | G03B 21/56 359/443 |
| 8,607,700 B2 * | 12/2013 | Niswonger | B41F 15/36 101/127.1 |
| 2002/0051289 A1 | 5/2002 | Congard | |
| 2005/0081726 A1 | 4/2005 | Anderson | |
| 2007/0153379 A1 | 7/2007 | Mikkelsen et al. | |
| 2007/0201004 A1 | 8/2007 | O'Connell et al. | |
| 2008/0030853 A1 | 2/2008 | Creel | |
| 2009/0316260 A1 | 12/2009 | Howes | |
| 2010/0321642 A1 | 12/2010 | Templier et al. | |
| 2012/0075697 A1 * | 3/2012 | Astill | G03B 21/58 359/461 |
| 2012/0250150 A1 | 10/2012 | Katsenelenson et al. | |
| 2014/0198362 A1 | 7/2014 | Tseng et al. | |
| 2017/0044826 A1 * | 2/2017 | Nakae | E06B 9/42 |

* cited by examiner

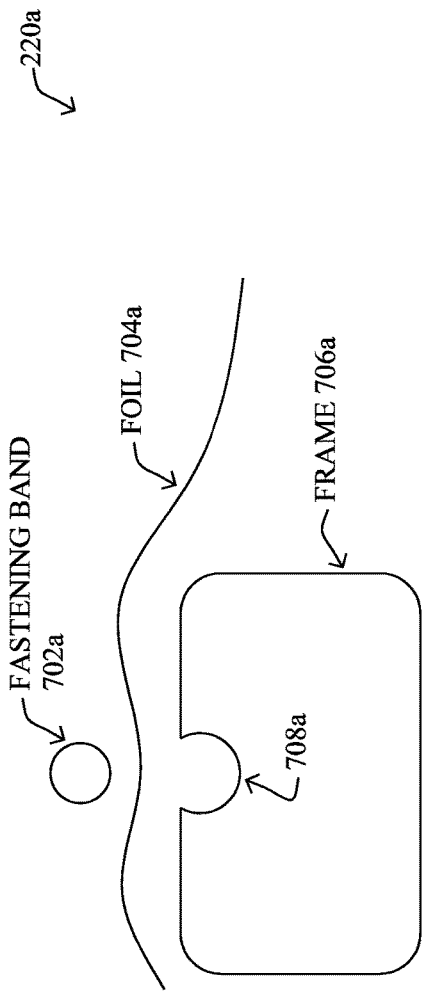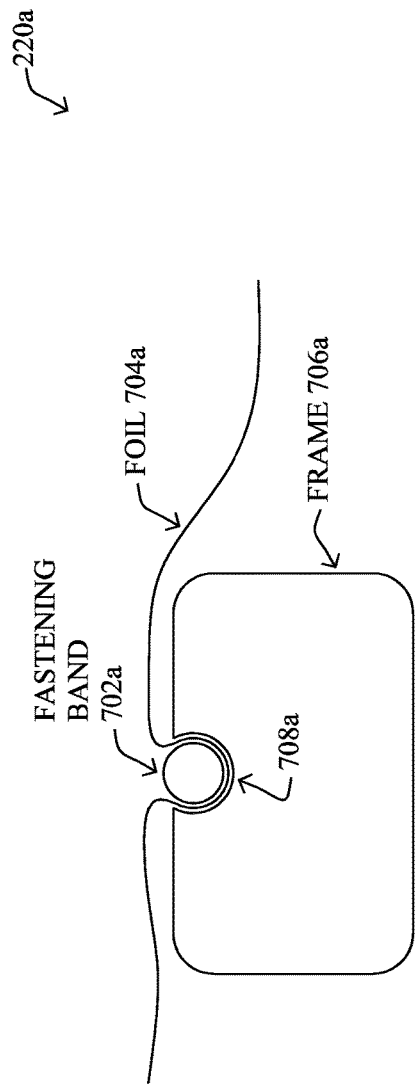

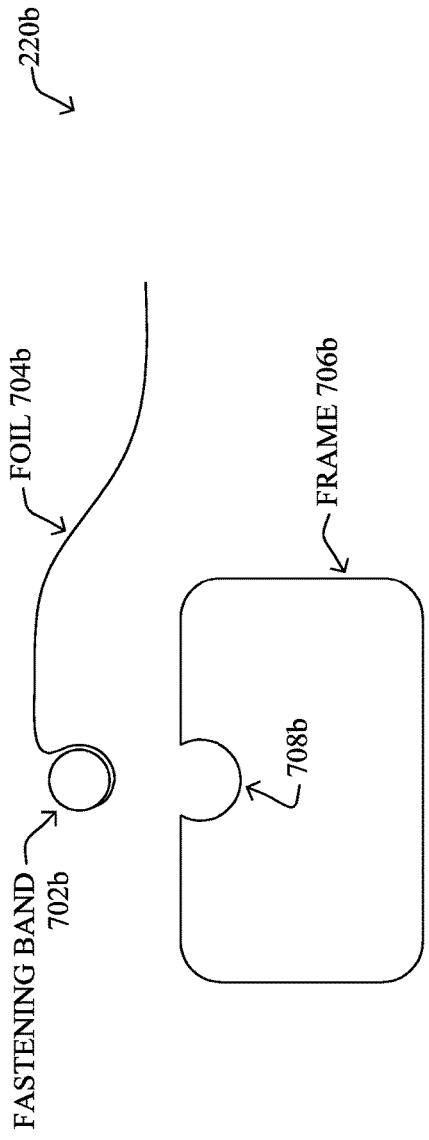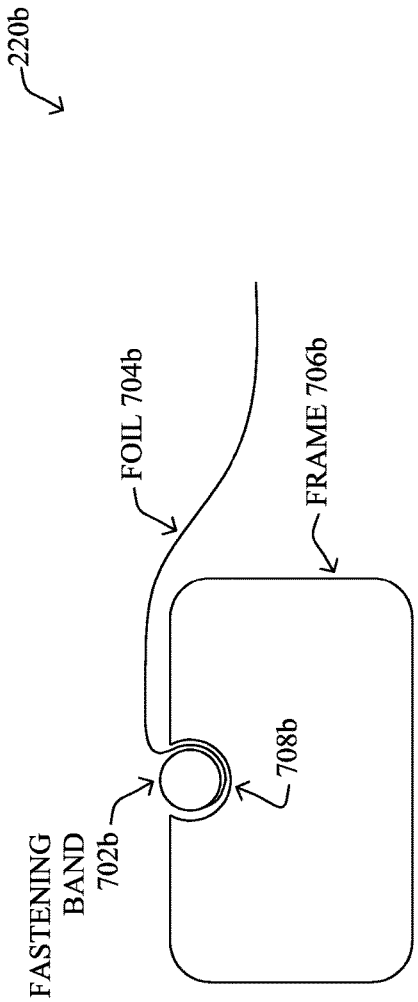

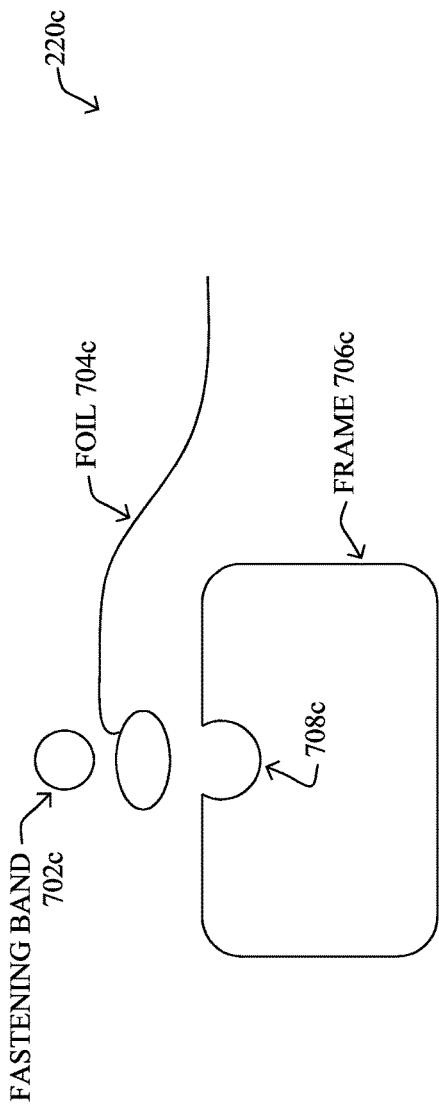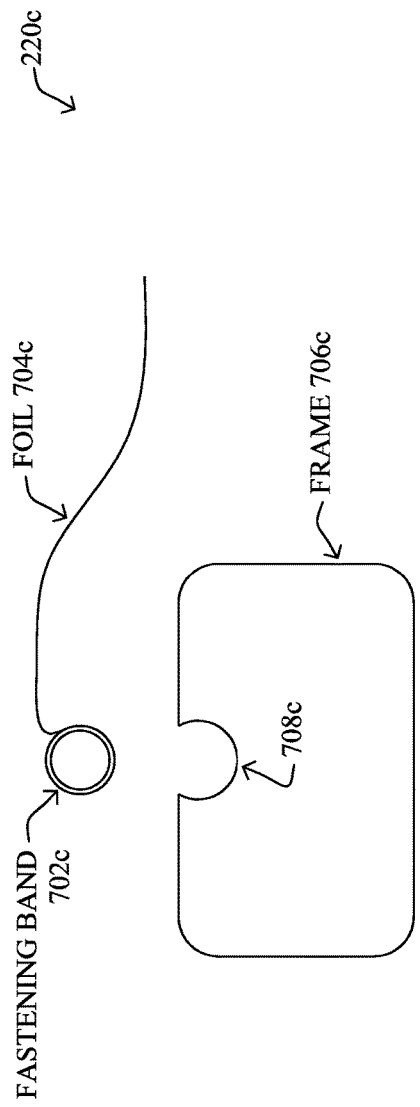

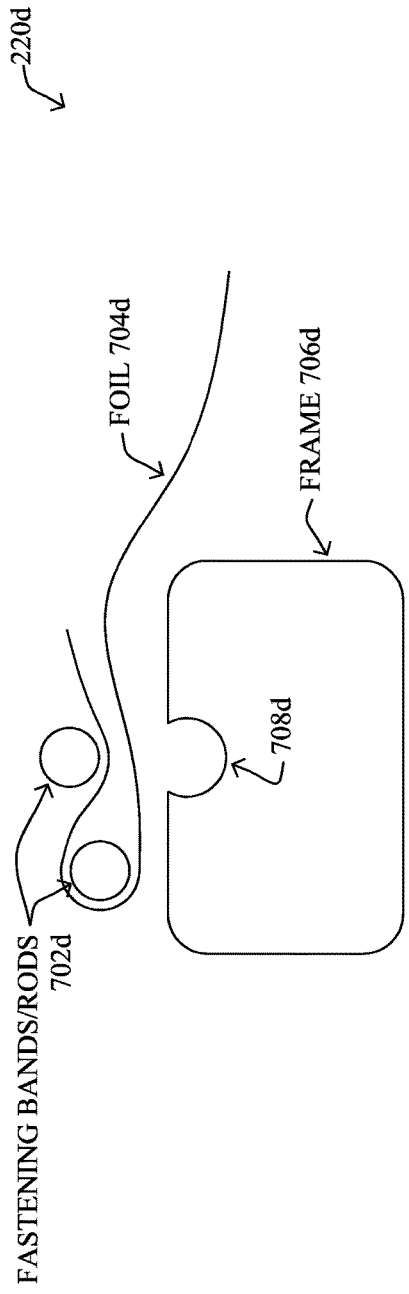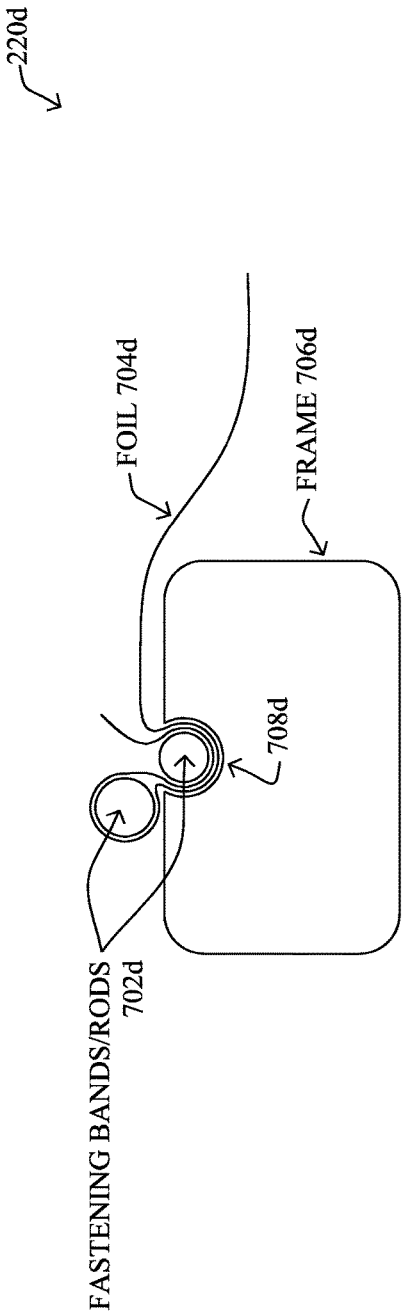

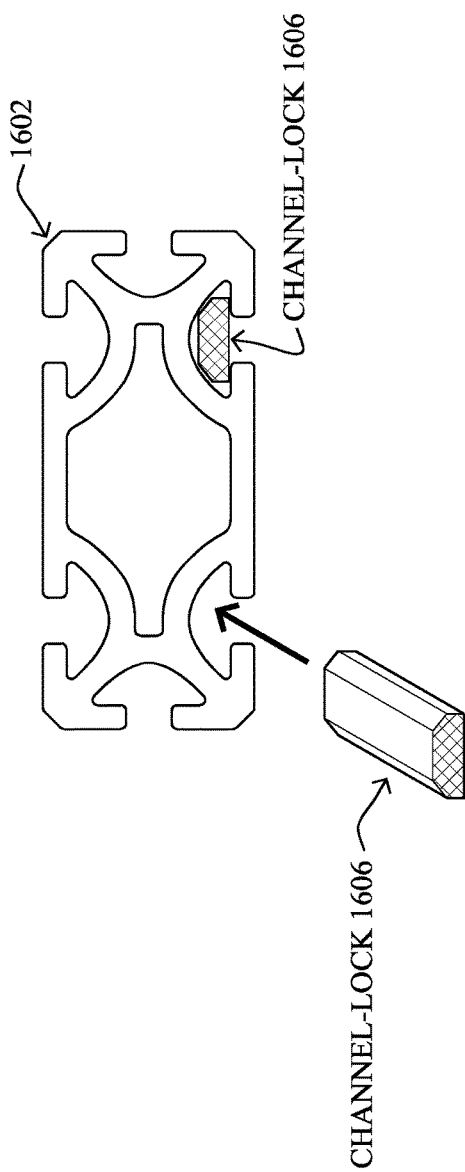
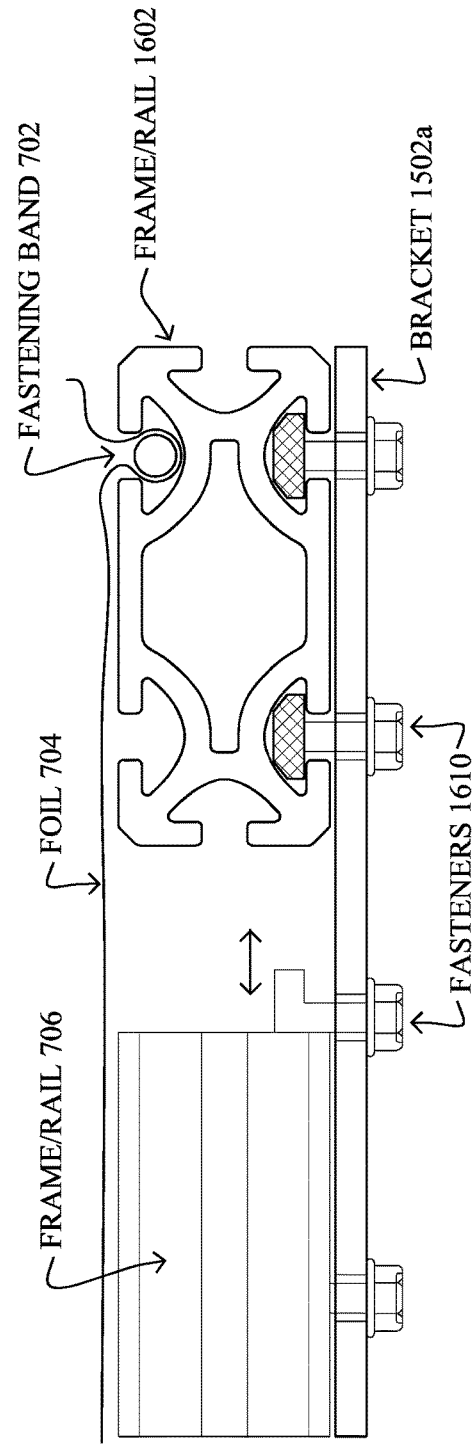
FIG. 16D
FIG. 16E

FOIL TENSIONING SYSTEM FOR PEPPER'S GHOST ILLUSION

RELATED APPLICATIONS

This application claims priority to the following U.S. Provisional Applications, the contents of each of which are incorporated herein by reference:

U.S. Provisional Application No. 62/130,582 filed on Mar. 9, 2015 entitled ROLLER-BASED FOIL TENSIONING SYSTEM FOR PEPPER'S GHOST ILLUSION, by Crowder, et al.;

U.S. Provisional Application No. 62/130,590 filed on Mar. 9, 2015, entitled FRAME-BASED FOIL TENSIONING SYSTEM FOR PEPPER'S GHOST ILLUSION, by Crowder, et al.; and U.S. Provisional Application No. 62/130,596 filed on Mar. 9, 2015, entitled SECURING FOIL TO A TENSIONING SYSTEM FOR PEPPER'S GHOST ILLUSION, by Crowder, et al.

TECHNICAL FIELD

The present disclosure relates generally to holographic projection, and, more particularly, to a foil tensioning systems (e.g., roller-based and/or frame based) for Pepper's Ghost Illusion.

BACKGROUND

The "Pepper's Ghost Illusion" is an illusion technique known for centuries (named after John Henry Pepper, who popularized the effect), and has historically been used in theatre, haunted houses, dark rides, and magic tricks. It uses plate glass, Plexiglas, or plastic film and special lighting techniques to make objects seem to appear or disappear, become transparent, or to make one object morph into another. Traditionally, for the illusion to work, the viewer must be able to see into a main room, but not into a hidden room. The hidden room may be painted black with only light-colored objects in it. When light is cast on the room, only the light objects reflect the light and appear as ghostly translucent images superimposed in the visible room.

Notably, Pepper's Ghost Illusion systems have generally remained the same since the 19th Century, adding little more over time than the use of projection systems that either direct or reflect light beams onto the transparent angled screen, rather than using live actors in a hidden room. That is, technologies have emerged in the field of holographic projection that essentially mimic the Pepper's Ghost Illusion, using projectors as the light source to send a picture of an object or person with an all-black background onto a flat, high-gain reflection surface (also referred to as a "bounce"), such as white or grey projection screen. The bounce is typically maintained at an approximate 45-degree angle to the transparent screen surface.

For example, a recent trend in live music performances has been to use a holographic projection of a performer (e.g., live-streamed, pre-recorded, or re-constructed). FIG. 1 illustrates an example of a conventional (generally large-scale) holographic projection system 100. Particularly, the streamed (or recorded, or generated) image of the artist (or other object) may be projected onto a reflective surface, such that it appears on an angled screen and the audience sees the artist or object and not the screen. If the screen is transparent, this allows for other objects, such as other live artists, to stand in the background of the screen, and to appear to be standing next to the holographic projection when viewed from the audience.

Still, despite its historic roots, holographic projection technology is an emerging field, particularly with regards to various aspects of enhancing the illusion and/or managing the setup of the system.

SUMMARY

Systems and methods herein are directed to foil tensioning systems for Pepper's Ghost Illusion.

According to one or more embodiments herein, securing foil to a tensioning system for Pepper's Ghost Illusion is shown and described. In particular, various embodiments are described that provide for a holographic foil to be secured to a frame (e.g., a roller system, an expanding frame, or a frame that can be pulled apart) on one or more sides, which can then be tensioned and fixed in place, therefore tightening the holographic screen material. Specifically, the frame is configured with one or more grooves along its length, and the foil is secured to the frame's groove(s) in a variety of manners. In a first embodiment, the holographic foil is placed over top of the frame and the fastening band is pushed into the groove on the frame on top of the foil along one side until that entire side is secured. In a second embodiment, the holographic foil is cut to the proper size for the desired frame, and a fastening band is glued or heat bonded onto the edges of the holographic foil, where these edges can then be snapped into the grooves on the frame. In a third embodiment, the holographic foil is cut to the proper size for the desired frame, and loops are made on the edges of the foil material (e.g., by folding it over and securing it to itself with glue or heat bonding). In one aspect of this embodiment, the loops may be placed into the frame's grooves, and a locking rod can then be threaded through the loops as it is pushed through the groove on the frame, locking the foil in place. In an alternative aspect, a compressible locking rod may be threaded through the loops beforehand, and then the compressible locking rod may be compressed into the groove to lock the foil in place. In a fourth embodiment, the foil can be secured with one locking rod with extra foil on the outside, which is then looped back over and a second rod is inserted into the groove creating a loop in the foil. This causes reverse forces on the material to hold it in place while the frame is tensioned.

According to one or more additional embodiments herein, a roller-based foil tensioning system for Pepper's Ghost Illusion is shown and described. In particular, various embodiments are described that provide for a holographic foil to be secured to a roller system on one or more sides, rolled outwards, and are then fixed in place, therefore tightening the holographic screen material. Illustratively, the foil can be secured to the frame in a variety of manners (e.g., into a groove of the frame with fastening bands, snaps, loops and a rod, two rods with a foil loop, etc.).

According to one or more additional embodiments herein, a frame-based foil tensioning system for Pepper's Ghost Illusion is shown and described. In particular, various embodiments are described that provide for a holographic foil to be secured to a frame system on one or more sides, stretched outwards by expansion of the frame's size (e.g., by a screw jack system), and are then fixed in place, therefore tightening the holographic screen material. Illustratively, the foil can be secured to the frame in a variety of manners (e.g., into a groove of the frame with fastening bands, snaps, loops and a rod, two rods with a foil loop, etc.).

Other specific embodiments, extensions, or implementation details are also described below.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 7A-7C illustrate a first example technique for securing a holographic foil to a tensioning frame in accordance with one or more embodiments herein;

FIGS. 8A-8C illustrate a second example technique for securing a holographic foil to a tensioning frame in accordance with one or more embodiments herein;

FIGS. 9A-9C illustrate a third example technique for securing a holographic foil to a tensioning frame in accordance with one or more embodiments herein;

FIGS. 10A-10B illustrate a fourth example technique for securing a holographic foil to a tensioning frame in accordance with one or more embodiments herein;

FIGS. 16A-16E illustrate example of components of a frame-based foil tensioning system for Pepper's Ghost Illusion in accordance with one or more embodiments herein;

DESCRIPTION OF EXAMPLE EMBODIMENTS

Figure 1:
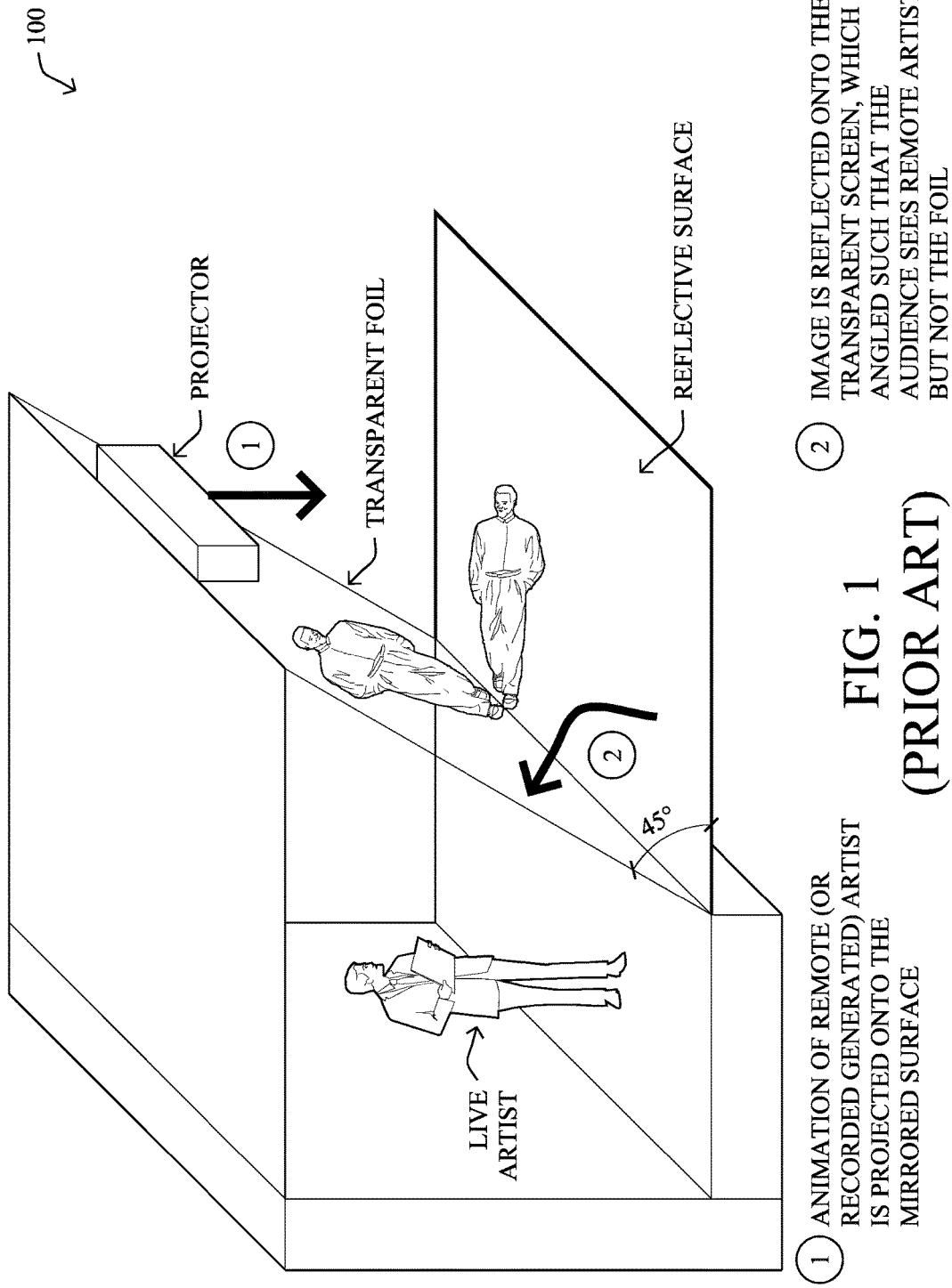
FIG. 1 illustrates an example of well-known holographic projection techniques.

As noted above, the "Pepper's Ghost Illusion" is an illusion technique that uses plate glass, Plexiglas, or plastic film and special lighting techniques to make holographic projections of people or objects. FIG. 1, in particular, illustrates an example of holographic projection using projectors as the light source to send a picture of an object or person with an all-black background onto a flat, high-gain reflection surface (or "bounce"), such as white or grey projection screen. The bounce is typically maintained at an approximate 45-degree angle to the transparent screen surface.

Figure 2:
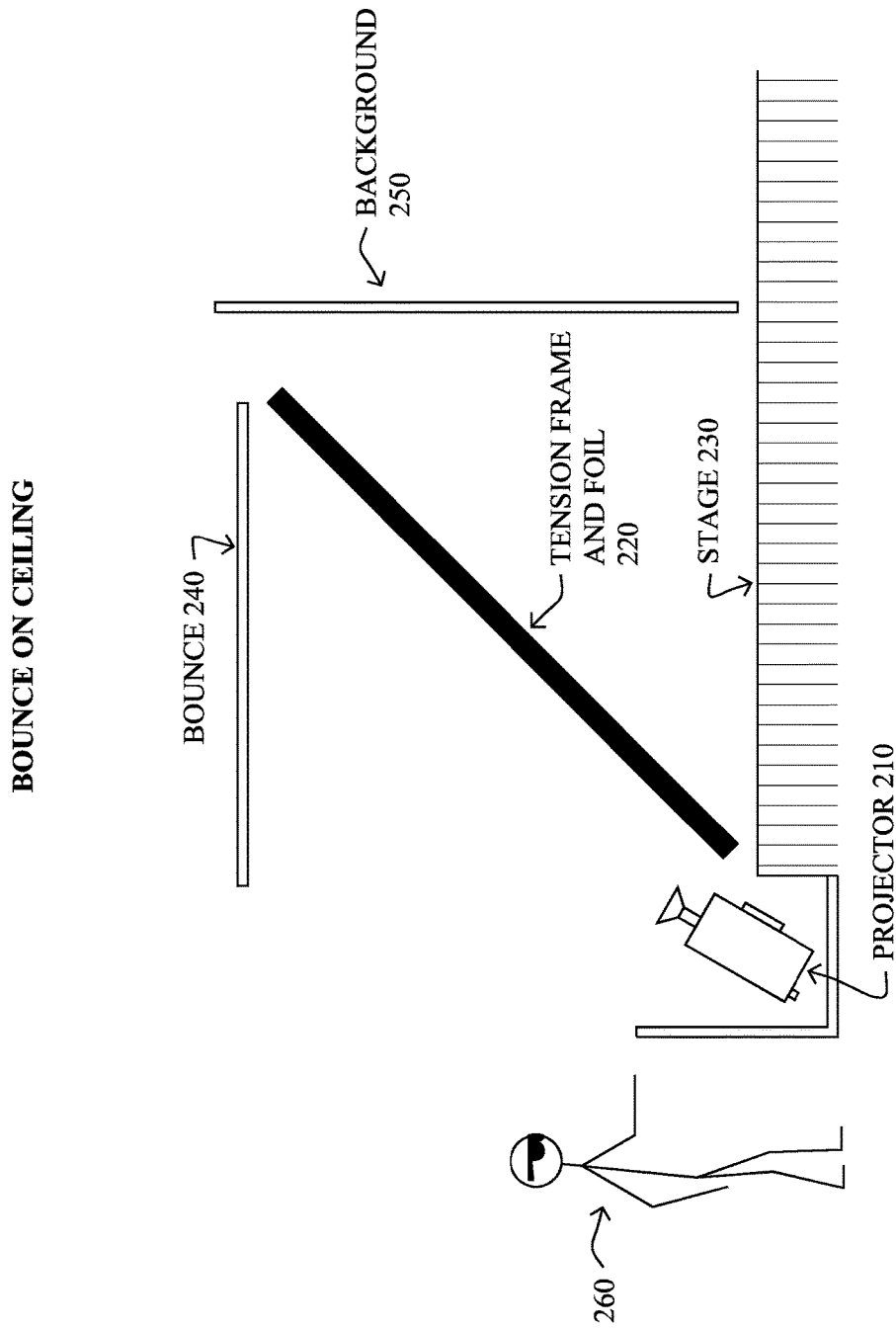
FIG. 2 illustrates an alternative arrangement for a projection-based holographic projection system, namely where the projector is located on the floor, and the bounce is located on the ceiling.

FIG. 2 illustrates an alternative arrangement for a projection-based holographic projection system, namely where the projector 210 is located on the floor, and the bounce 240 is located on the ceiling. The stick figure illustrates the viewer 260, that is, from which side one can see the holographic projection. In this arrangement, the same effect can be achieved as in FIG. 1, though there are various considerations as to whether to use a particular location of the projector 210 as in FIG. 1 or FIG. 2.

Though the projection-based system is suitable in many situations, particularly large-scale uses, there are certain issues with using projectors in this manner. For example, if atmosphere (e.g., smoke from a fog machine) is released, the viewer 260 can see where the light is coming from, thus ruining the effect. Also, projectors are not typically bright enough to shine through atmosphere, which causes the reflected image to look dull and ghost-like. Moreover, projectors are large and heavy which leads to increased space requirements and difficulty rigging.

Figure 3:
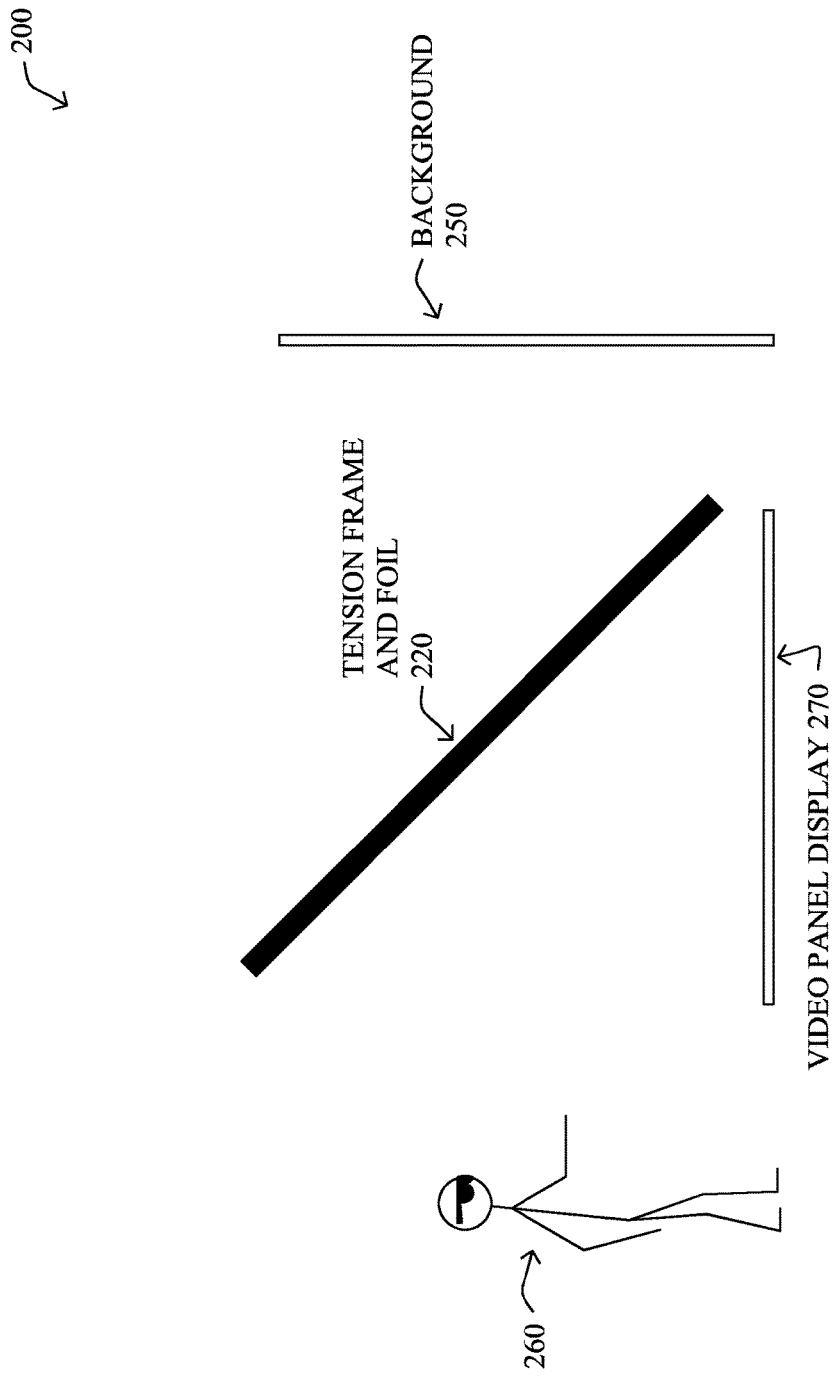
FIG. 3 illustrates an example of a holographic projection system using video panel displays, with the panel below a transparent screen.
Figure 4:
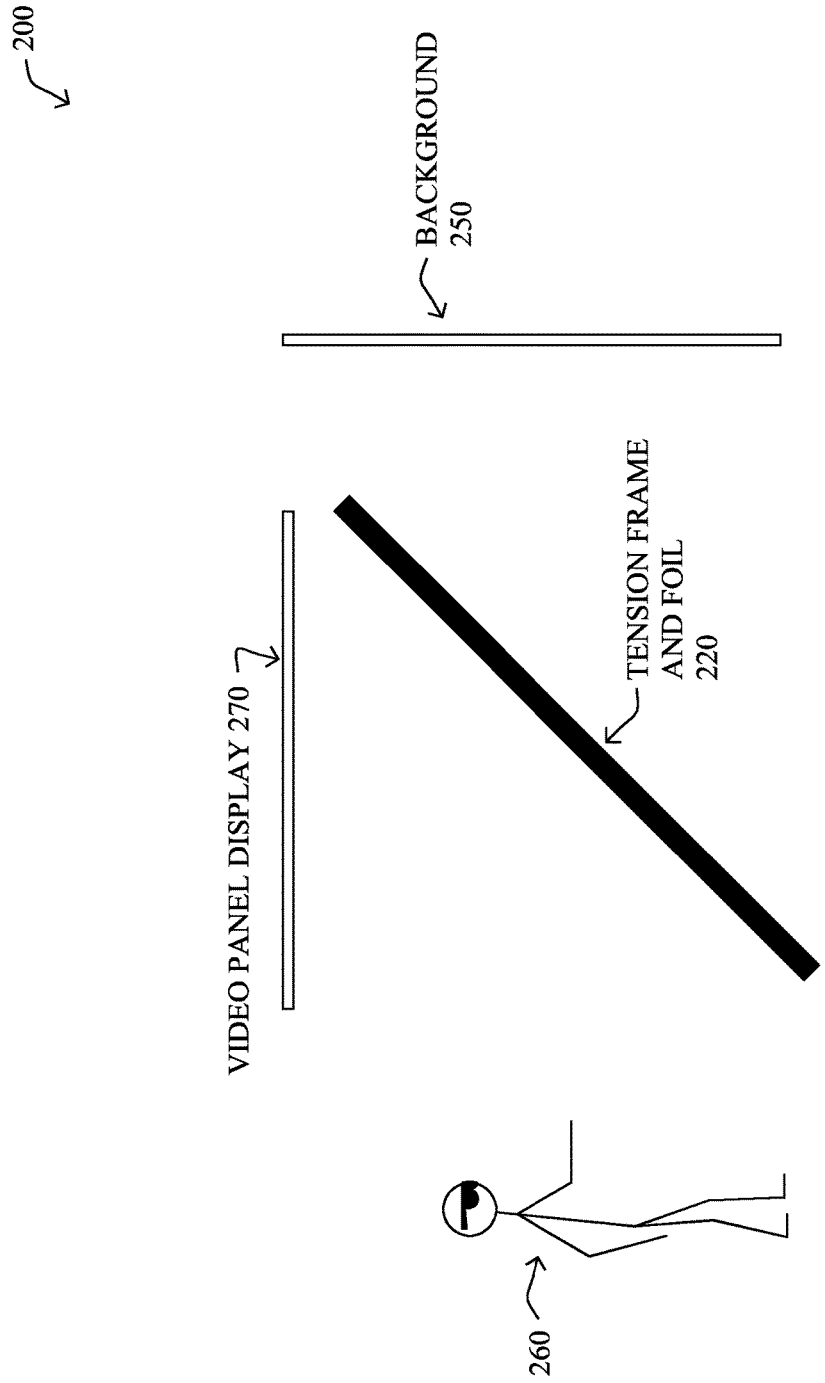
FIG. 4 illustrates an example of a holographic projection system using video panel displays, with the panel above a transparent screen.

Another example holographic projection system, therefore, with reference generally to FIGS. 3 and 4, may be established with video panel displays 270, such as LED or LCD panels, mobile phones, tablets, laptops, or monitors as the light source, rather than a projection-based system. In particular, these panel-based systems allow for holographic projection for any size setup, such as from personal "mini" displays (e.g., phones, tablets, etc.) up to the larger full-stage-size displays (e.g., with custom-sized LCD or LED panels). Similar to the typical arrangement, a preferred angle between the image light source and the reflective yet transparent surface (clear screen) is an approximate 45-degree angle, whether the display is placed below the transparent screen (FIG. 3) or above it (FIG. 4).

Again, the stick figure illustrates the viewer 260, that is, from which side one can see the holographic projection. Note that the system typically provides about 165-degrees of viewing angle. (Also note that various dressings and props can be designed to hide various hardware components and/or to build an overall scene, but such items are omitted for clarity.)

The transparent screen is generally a flat surface that has similar light properties of clear glass (e.g., glass, plastic such as Plexiglas or tensioned plastic film). As shown, a tensioning frame 220 is used to stretch a clear foil into a stable, wrinkle-free (e.g., and vibration resistant) reflectively transparent surface (that is, displaying/reflecting light images for the holographic projection, but allowing the viewer to see through to the background). Generally, for larger displays it may be easier to use a tensioned plastic film as the reflection surface because glass or rigid plastic (e.g., Plexiglas) is difficult to transport and rig safely.

The light source itself can be any suitable video display panel, such as a plasma screen, an LED wall, an LCD screen, a monitor, a TV, a tablet, a mobile phone, etc. A variety of sizes can be used. When an image (e.g., stationary or moving) is shown on the video panel display 270, such as a person or object within an otherwise black (or other stable dark color) background, that image is then reflected onto the transparent screen (e.g., tensioned foil or otherwise), appearing to the viewer (shown as the stick figure) in a manner according to Pepper's Ghost Illusion. However, different from the original Pepper's Ghost Illusions using live actors/objects, and different from projector-based holographic systems, the use of video panel displays reduces or eliminates the "light beam" effect through atmosphere (e.g., fog), allowing for a clearer and un-tainted visual effect of the holographic projection. (Note that various diffusion layers may be used to reduce visual effects created by using video panel displays, such as the Moire effect.) Also, using a video panel display 270 may help hide projector apparatus, and may reduce the overall size of the holographic system.

Additionally, some video panels such as LED walls are able to generate a much brighter image than projectors are able to generate thus allowing the Pepper's Ghost Illusion to remain effective even in bright lighting conditions (which generally degrade the image quality). The brighter image generated from an LED wall also allows for objects behind the foil to be more well lit than they can be when using projection.

In addition, by displaying an image of an object or person with a black background on the light source, it is reflected onto the transparent flat surface so it looks like the object or person is floating or standing on its own. In accordance with typical Pepper's Ghost Illusion techniques, a stage or background can be put behind and/or in front of the transparent film so it looks like the object or person is standing on the stage, and other objects or even people can also be on either side of the transparent film.

In certain embodiments, to alleviate the large space requirement in setting up a Pepper's Ghost display (e.g., to display a realistic holographic projection, a large amount of depth is typically needed behind the transparent screen), an optical illusion background may be placed behind the transparent screen in order to create the illusion of depth behind the screen (producing a depth perception or "perspective" that gives a greater appearance of depth or distance behind a holographic projection).

In general, holographic projections may be used for a variety of reasons, such as entertainment, demonstration, retail, advertising, visualization, video special effects, and so on. The holographic images may be produced by computers that are local to the projectors or video panels, or else may be generated remotely and streamed or otherwise forwarded to local computers.

As an example, by streaming the video image of the performer as a video and projecting it onto a holographic projection system, a true concert or nightclub experience can be transmitted across the globe for the live entertainment experience. For instance, holographically live-streaming concerts to satellite venues around the globe while maintaining the live concert experience helps artists reach new markets and new revenue streams, while bringing live sets to more fans all across the world. Satellite venues can be configured to have the same concert feel as an actual show: intense lighting effects, great sound quality, bars, merchandise, etc. The only difference is that the performers are not physically present, but are holographically projected from the broadcast venue. The music is streamed directly from the soundboard of the broadcast venue and sent to state-of-the-art sound systems at the satellite venues. Light shows may accompany the performance with top of the line LED screens and lasers.

Figure 5:
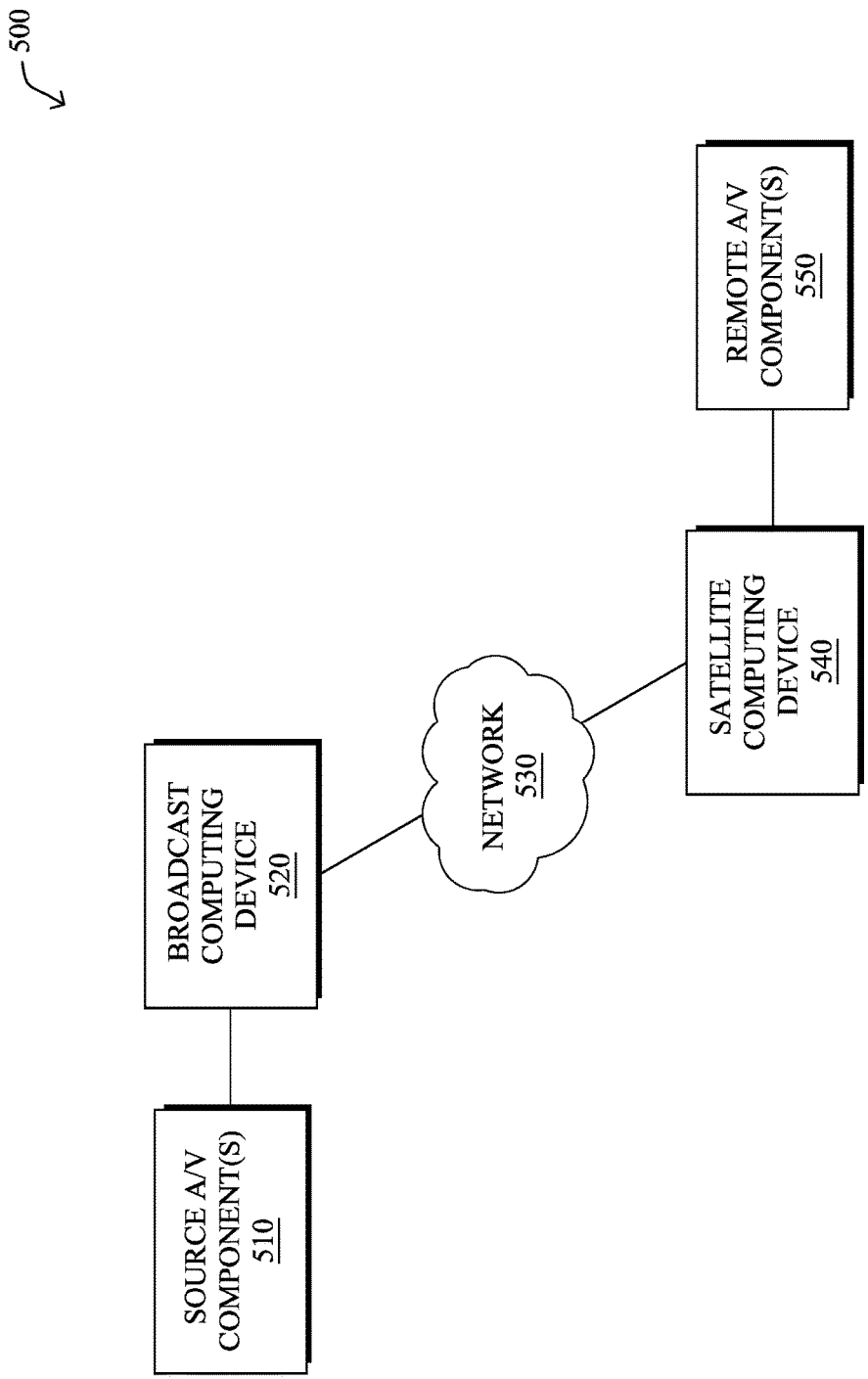
FIG. 5 illustrates an example simplified holographic projection system (e.g., communication network)

For instance, FIG. 5 illustrates an example simplified holographic projection system (e.g., communication network), where the network 500 comprises one or more source A/V components 510, one or more "broadcast" computing devices 520 (e.g., a local computing device), a communication network 530 (e.g., the public Internet or other communication medium, such as private networks), one or more "satellite" computing devices 540 (e.g., a remote computing device), and one or more remote A/V components 550.

In the example above, a broadcast venue may comprise the source A/V components 510, such as where a performance artist is performing (e.g., where a disc jockey (DJ) is spinning) in person. The techniques herein may then be used to stream (relay, transmit, re-broadcast, etc.) the audio and video from this broadcast location to a satellite venue, where the remote A/V components 550 are located. For instance, the DJ in the broadcast location may have the associated audio, video, and even corresponding electronic effects (lights, pyrotechnics, etc.) streamed directly to the satellite venue's A/V system with the same high quality sound as if the musician/artist was playing/singing in person.

As another example, in computing, an "avatar" is the graphical representation of the user (or the user's alter ego or other character). Avatars may generally take either a two-dimensional (2D) form or three-dimensional (3D) form, and typically have been used as animated characters in computer games or other virtual worlds (e.g., in addition to merely static images representing a user in an Internet forum). To control an avatar or other computer-animated model (where, notably, the term "avatar" is used herein to represent humanoid and non-humanoid computer-animated objects that may be controlled by a user), a user input system converts user action into avatar movement.

Figure 6:
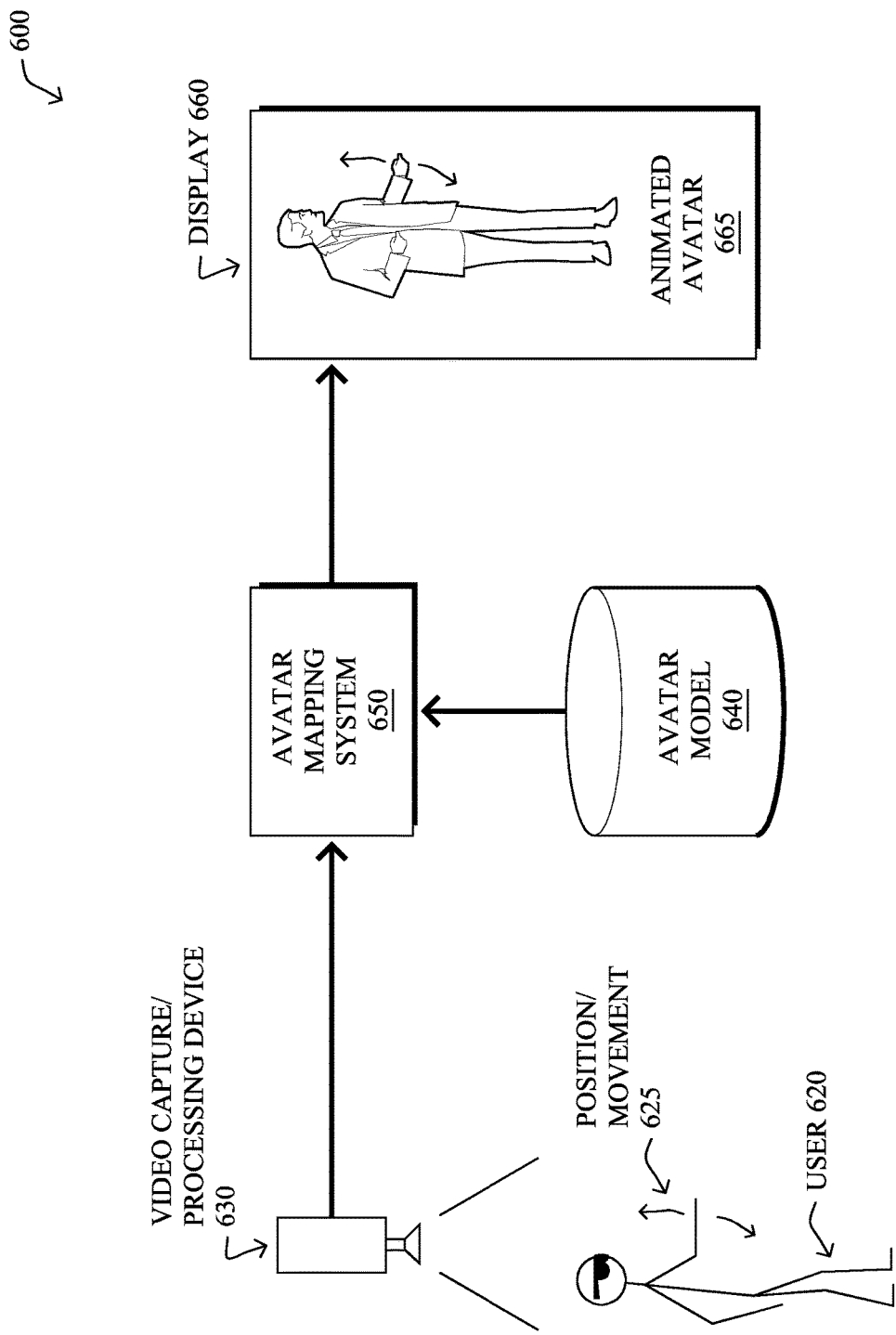
FIG. 6 illustrates a simplified example of an avatar control system.

FIG. 6 illustrates a simplified example of an avatar control system. In particular, as shown in the system 600, a video capture/processing device 610 is configured to capture video images of one or more objects, particularly including one or more users 620 that may have an associated position and/or movement 625. The captured video data may comprise color information, position/location information (e.g., depth information), which can be processed by various body tracking and/or skeletal tracking algorithms to detect the locations of various tracking points (e.g., bones, joints, etc.) of the user 620. An avatar mapping system 650 may be populated with an avatar model 640, such that through various mapping algorithms, the avatar mapping system is able to animate an avatar 665 on a display 660 as controlled by the user 620. Illustratively, in accordance with the techniques herein the display 660 may comprise a holographic projection of the model animated avatar 665, e.g., allowing an individual to interactively control a holographic projection of a character. (Notably, the avatar mapping system 650 may provide its control functionality in real-time or as a recorded/post-production video feed, and may be co-located with the video processing system 630, remotely located from the video processing system, or as divided components allowing it to be both local to and remote from the video processing system.)

—Securing Foil to a Tensioning System for Pepper's Ghost Illusion—

As noted above, an illustrative holographic display system often comprises a flexible foil as the holographic screen, placed at about a 45-degree angle to the image source. For example, the holographic foil has very high (e.g., 98%) clarity, so when it is stretched (tensioned), it is not seen by the human eye, similar to a glass window. The foil may generally be tensioned by a frame, which attempts to evenly tension the holographic foil from opposing sides (e.g., from two sides or, as made available by the techniques herein, from all four sides), placing up to 6000 lbs of pressure on the foil material. This ensures that there are no wrinkles in the foil, and prevents or reduces vibrations due to audio, HVAC, or other environmental factors so it completely disappears from a person's line of sight.

To date, current tensioning methods for holographic foil are cumbersome, large, and generally only tension two parallel sides of the foil. Also, the techniques used to secure the foil to the tensioning system are clumsy, difficult to align, and may not allow for the proper tensioning forces to be applied to the foil, where the foil could slip from various compression-based (e.g., pinching) holds.

According to one or more embodiments herein, a holographic foil can be secured to a tensioning system for Pepper's Ghost Illusion in a variety of manners. In particular, various embodiments are described herein that provide for a holographic foil to be secured to a frame (e.g., a roller system, an expanding frame, or a frame that can be pulled apart) on one or more sides, which can then be tensioned and fixed in place, therefore tightening the holographic screen material. Specifically, the frame may be configured with one or more grooves along its length, and the foil is secured to the frame's groove(s) in a variety of manners, detailed below. (The shapes illustrated for the groove, fastening band, and frame, unless otherwise specifically mentioned, in any of the examples below, are not meant to be limiting to the scope of the embodiments herein. Note also that multiple securing grooves may be used if desired for added security.)

Figure 7C:
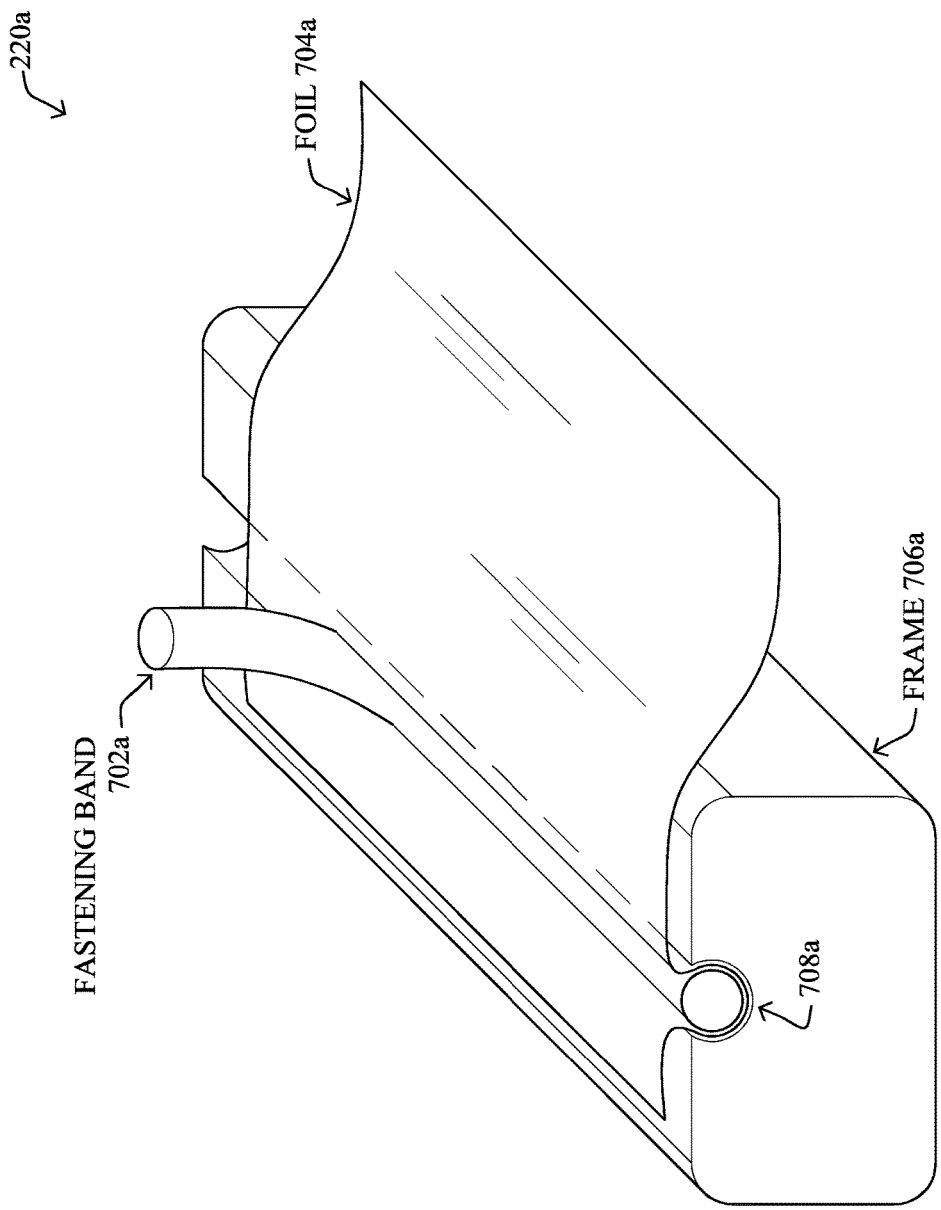

In a first embodiment, with reference generally to FIGS. 7A-7C, the holographic foil 704a may be placed over the top of the frame 706a, and a fastening band 702a may be pushed into the groove 708a on the frame 706a on top of the foil 704a along one side until that entire side is secured. The fastening band 702a may be a flexible, compressible material, such as rubber, rope, plastic tubing, etc., and may generally "squeeze" into the groove, securing the foil 704a in place.

Figure 8C:
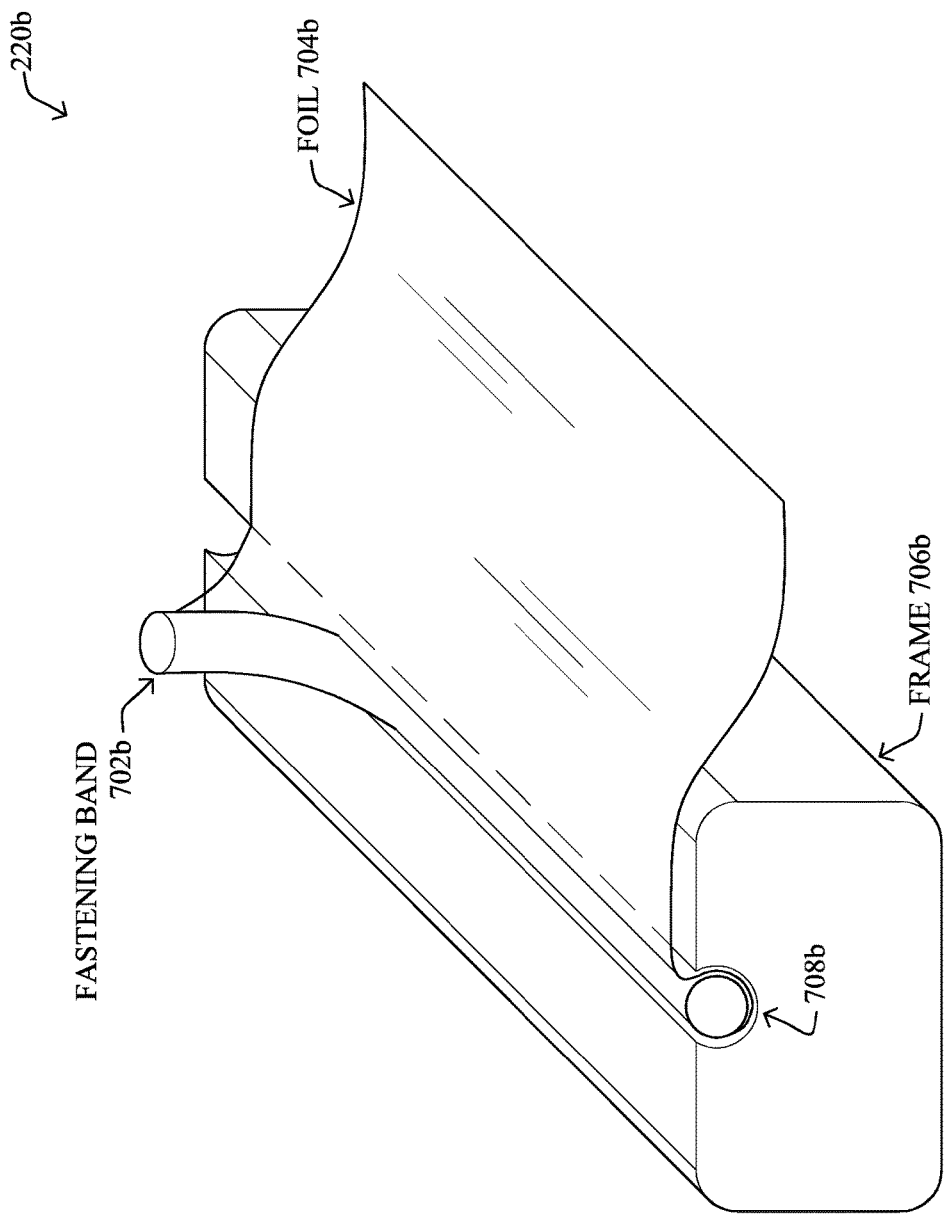

In a second embodiment, with reference generally to FIGS. 8A-8C, the holographic foil 704b may be cut to the proper size for the desired frame 706b, and a fastening band 702b may be bonded (e.g., glued or heat bonded) onto the edges of the holographic foil 704b, where these edges can then be snapped into the grooves 708b on the frame 706b. Note that the specific location of the bonded fastening band 702b with relation to the foil 704b need not be limited to the view shown, and the band 702b may be located at the very end of the foil 704b, near the end of the foil 704b, on top of the foil 704b, beneath the foil 704b, etc.

Figure 9C:
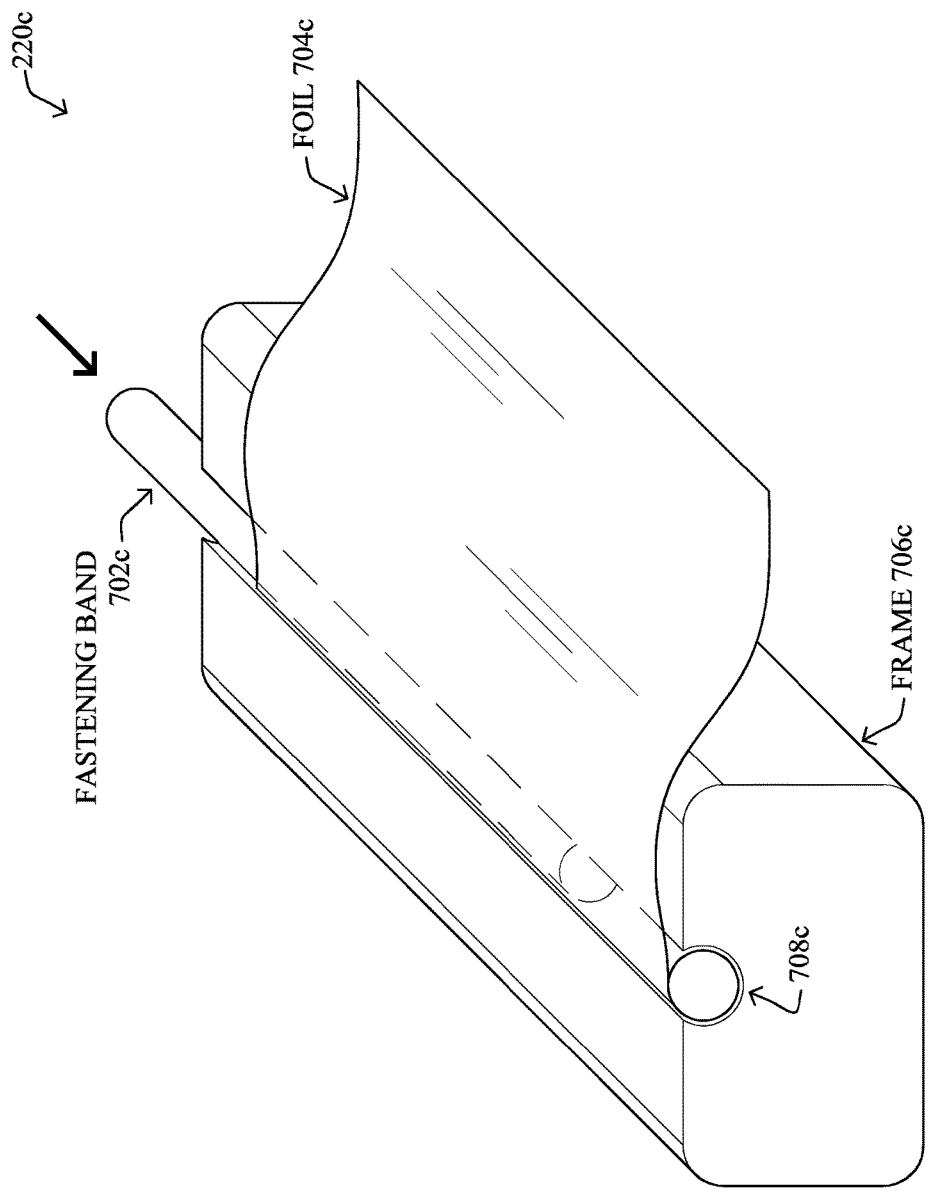

In a third embodiment, with reference generally to FIGS. 9A-9C, the holographic foil 704c may be cut to the proper size for the desired frame 706c, and loops are made on the edges of the foil material (e.g., by folding it over and securing it to itself with glue or heat bonding). The loops may comprise a single loop on each edge of the foil 704c (e.g., one continuous loop along the entire length of the foil 704c), or else a plurality of smaller loops may be formed. In one aspect of this embodiment, as shown in FIGS. 9A and 9C, the loops may be placed into the grooves 708c of frame 706c, and a fastening band/locking rod 702c can then be threaded through the loops as it is pushed through the groove 708c on the frame 706c, locking the foil 704c in place. In an alternative aspect, as shown in FIG. 9B, a compressible locking rod 702c may be threaded through the loops beforehand, and then the compressible locking rod 702c may be compressed into the groove 708c to lock the foil 704c in place (similar to FIG. 8C above).

In a fourth embodiment, with reference generally to FIGS. 10A-10B, the foil 704d can be secured with one fastening band/locking rod 702d with extra foil on the outside, which is then looped back over and a second band/rod is inserted into the groove 707d creating a loop in the foil 704d. This causes reverse forces on the material to hold it in place while the frame 706d is tensioned. Similar to FIG. 9C or 8C above, this second rod 702d can be inserted into the groove 708d by sliding it down the length or by compressing it into place, respectively.

Figure 11A:
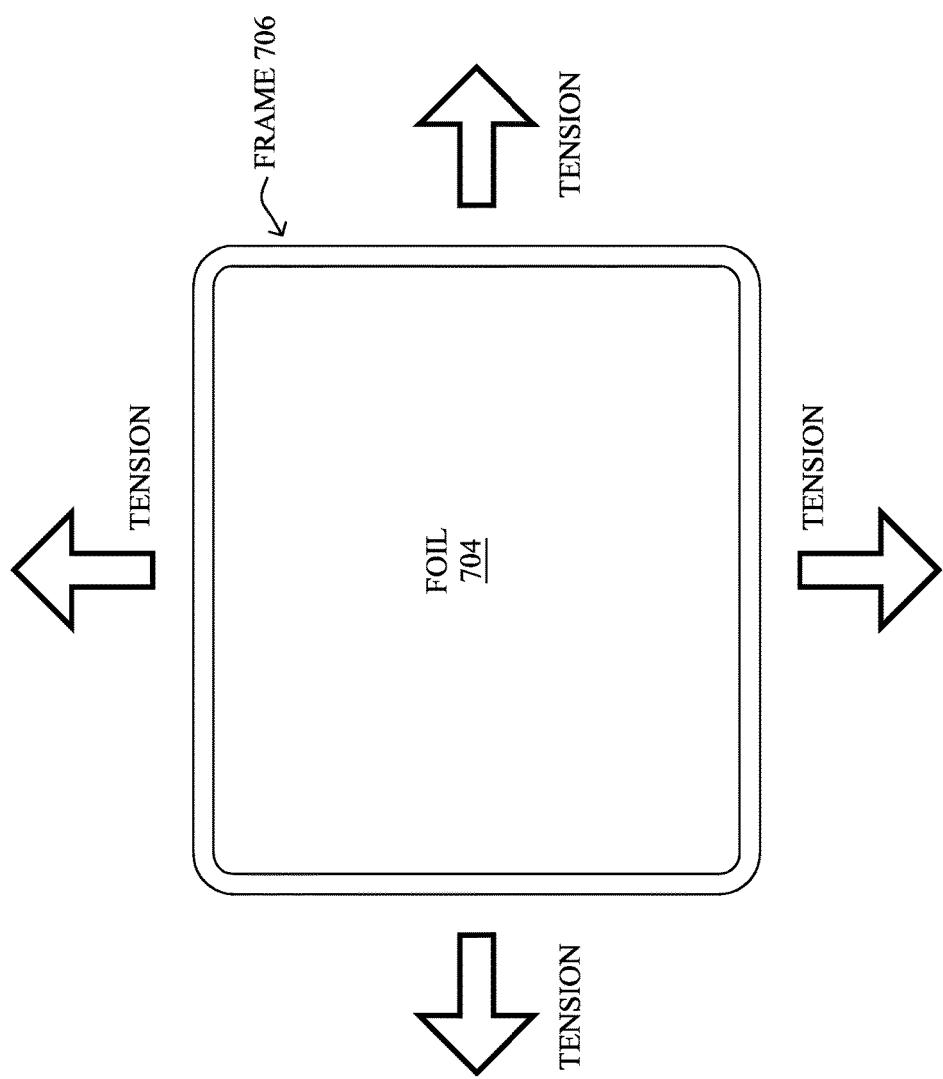
FIGS. 11A-11C illustrate a simplified view of screen tensioning once the foil is secured in place in accordance with one or more embodiments herein.
Figure 11B:
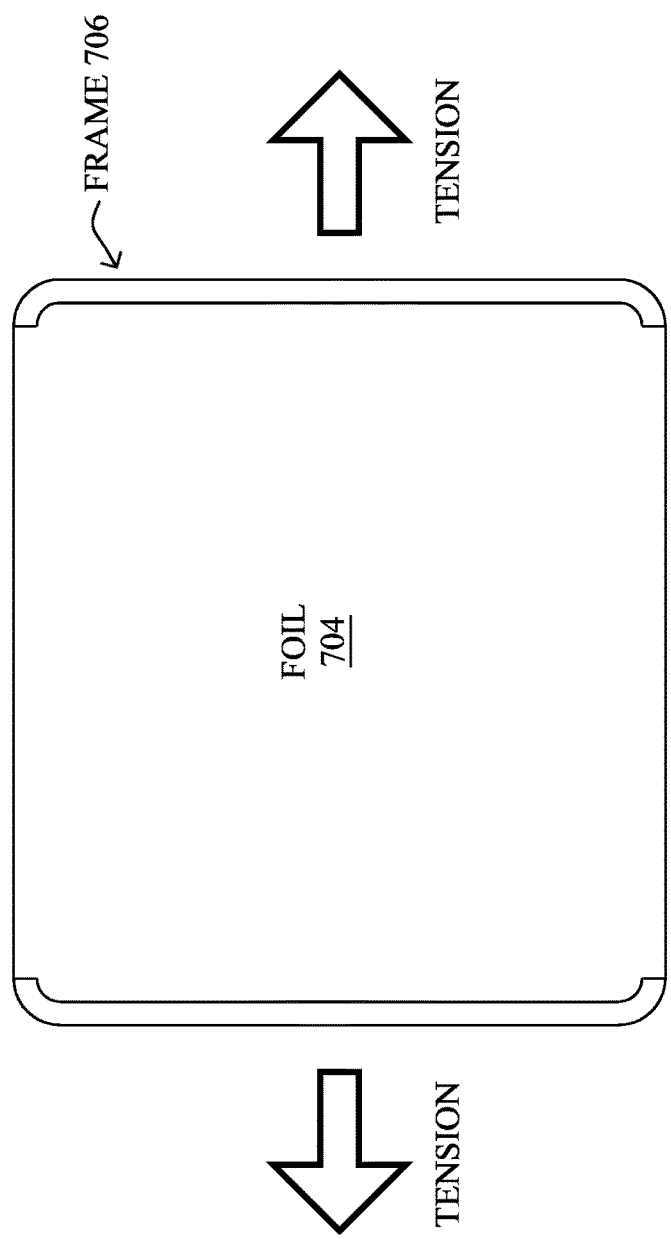
Figure 11C:
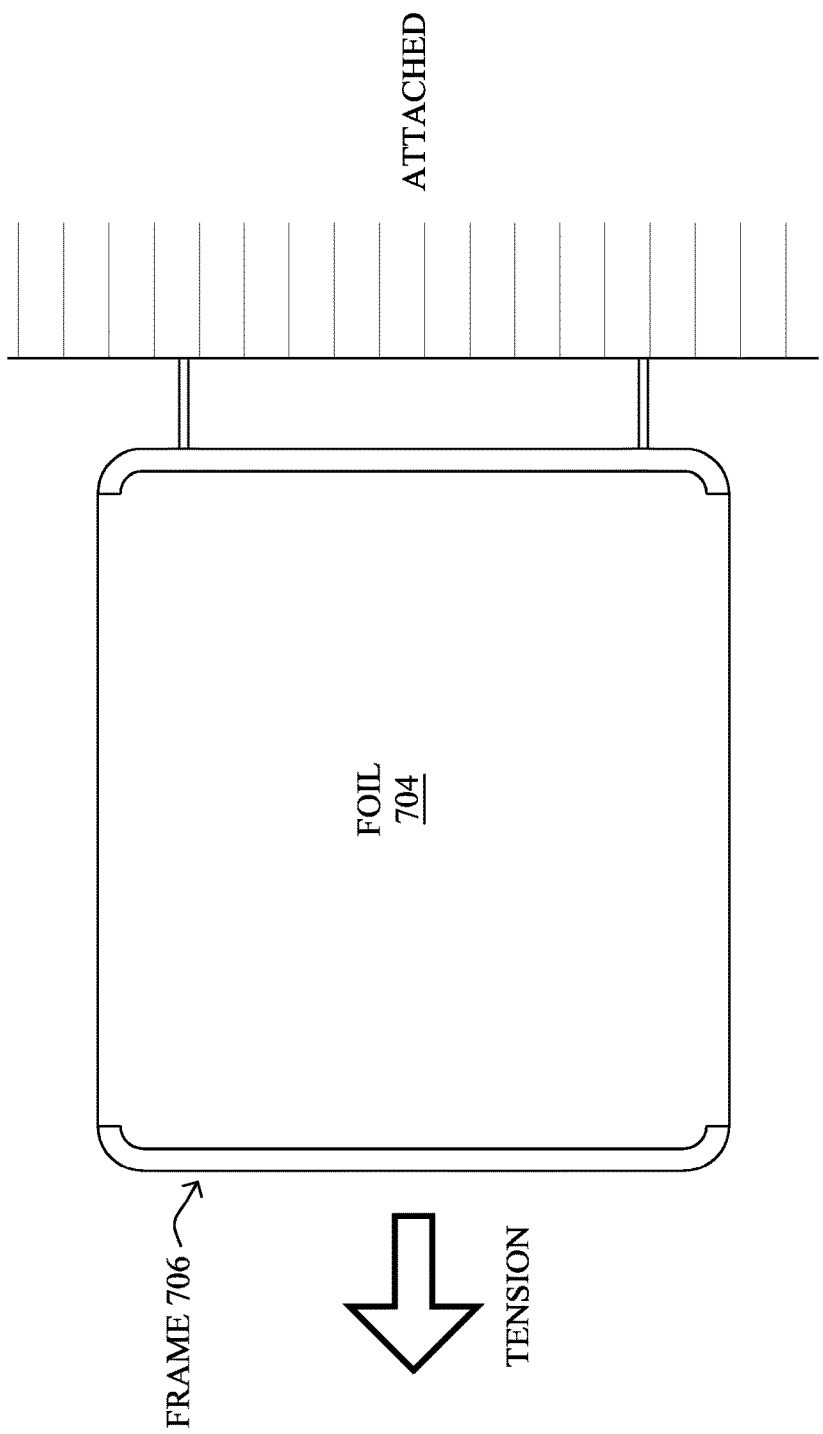

FIGS. 11A-11C illustrate a simplified view of screen tensioning once the foil 704 is secured in place. In particular, as shown in FIG. 11A, all four sides of the frame 706 may be used to apply tension to the frame, while in FIG. 11B, only two opposing sides are used. FIG. 11C shows a further example, where a first opposing side of a frame 706 is secured to a stationary location, and then the second opposing side is adjusted to apply the tension. Any combination of FIGS. 11A-11C may be used, such as securing any number of sides of the frame 706 to stationary locations and tensioning any number of opposing sides of the frame 706. That is, the foil need not be attached and tensioned from all four sides, but could instead be attached to two parallel side members (in any of the ways listed above) and tensioned only from one direction by attaching these members to objects to pull the foil tight, etc. Notably, the mechanism used to create such tensioning force may comprise any sort of pulling technique (e.g., pulling outwardly on the frames in opposing directions), pushing techniques (e.g., pushing outwardly on the frames in opposing directions), or rolling techniques (e.g., rolling the frame outwardly), or any suitable combination thereof.

Figure 12:
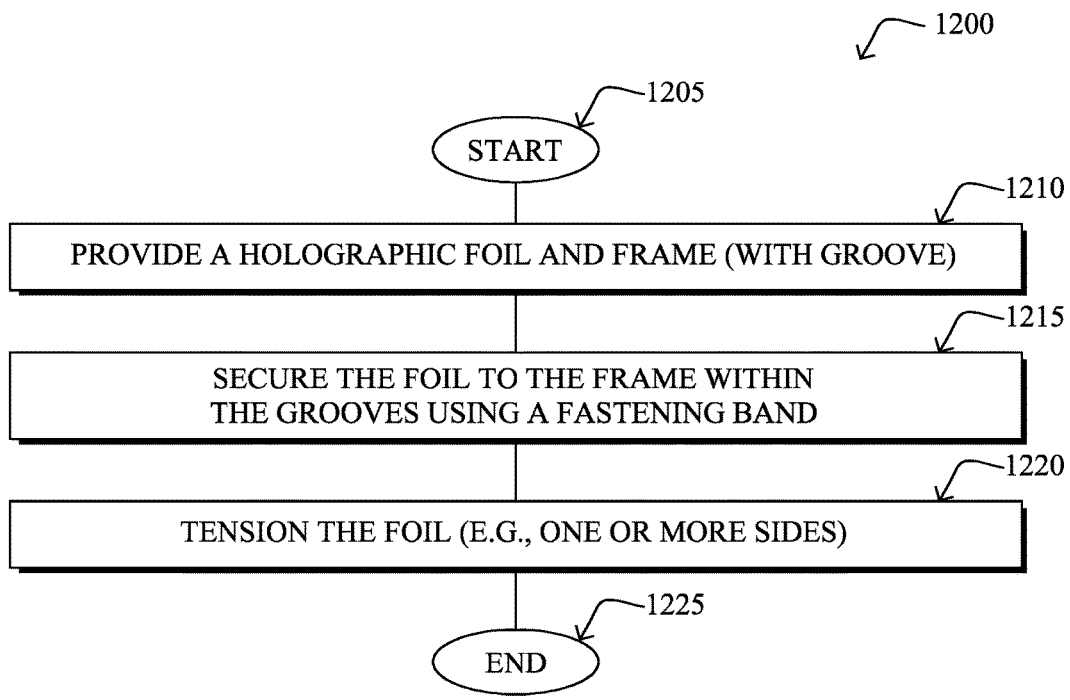
FIG. 12 illustrates an example procedure for securing foil to a tensioning system for Pepper's Ghost Illusion in accordance with one or more embodiments herein.

FIG. 12 illustrates an example simplified procedure for securing foil to a tensioning system for Pepper's Ghost Illusion in accordance with one or more embodiments described herein. The simplified procedure 1200 may start at step 1205, and continues to step 1210, where a holographic foil and frame (with groove) are provided. Then, based on any of the specific embodiments above, the foil may be secured to the frame within the grooves using a fastening band in step 1215. For example, as mentioned above, the band may be pressed on top of the foil, or may be integrated within the foil (bonded, looped, etc.). In step 1220, the foil may be tensioned (e.g., one or more sides), and the simplified procedure ends in step 1225.

It should be noted that while certain steps within procedure 1200 may be optional as described above, the steps shown in FIG. 12 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Advantageously, the techniques herein secure foil to a tensioning system for Pepper's Ghost Illusion. In particular, as mentioned above, the techniques described herein secure a holographic foil to a frame system on one or more sides in a manner that allows tightening the holographic screen material. For example, the techniques herein alleviate the cumbersome nature associated with current tensioning methods for holographic foils, which are large and can only tension two parallel sides of the foil (where the techniques above can tension two or four sides). Additionally, the securing techniques herein allow for increased tension on the foil, alleviating vibration issues (e.g., due to HVAC, sound, etc.) seen in existing tensioning methods. Moreover, the tensioning system herein may also has a thin profile, which allows it to be installed in a variety of locations that are not possible with existing methods due to their size and weight.

—Roller-Based Foil Tensioning System for Pepper's Ghost Illusion—

According to the present invention, in particular, a roller-based foil tensioning system for Pepper's Ghost Illusion is specifically described herein that provides for a holographic foil to be secured to a roller system on two or four sides, rolled outwards, and are then fixed (e.g., bolted) in place, therefore tightening the holographic screen material. (Note that the above-mentioned foil-securing techniques are not meant to be limiting to the scope of the present invention, and other foil-securing techniques may be used in conjunction with the tensioning system described below.)

Figure 13A:
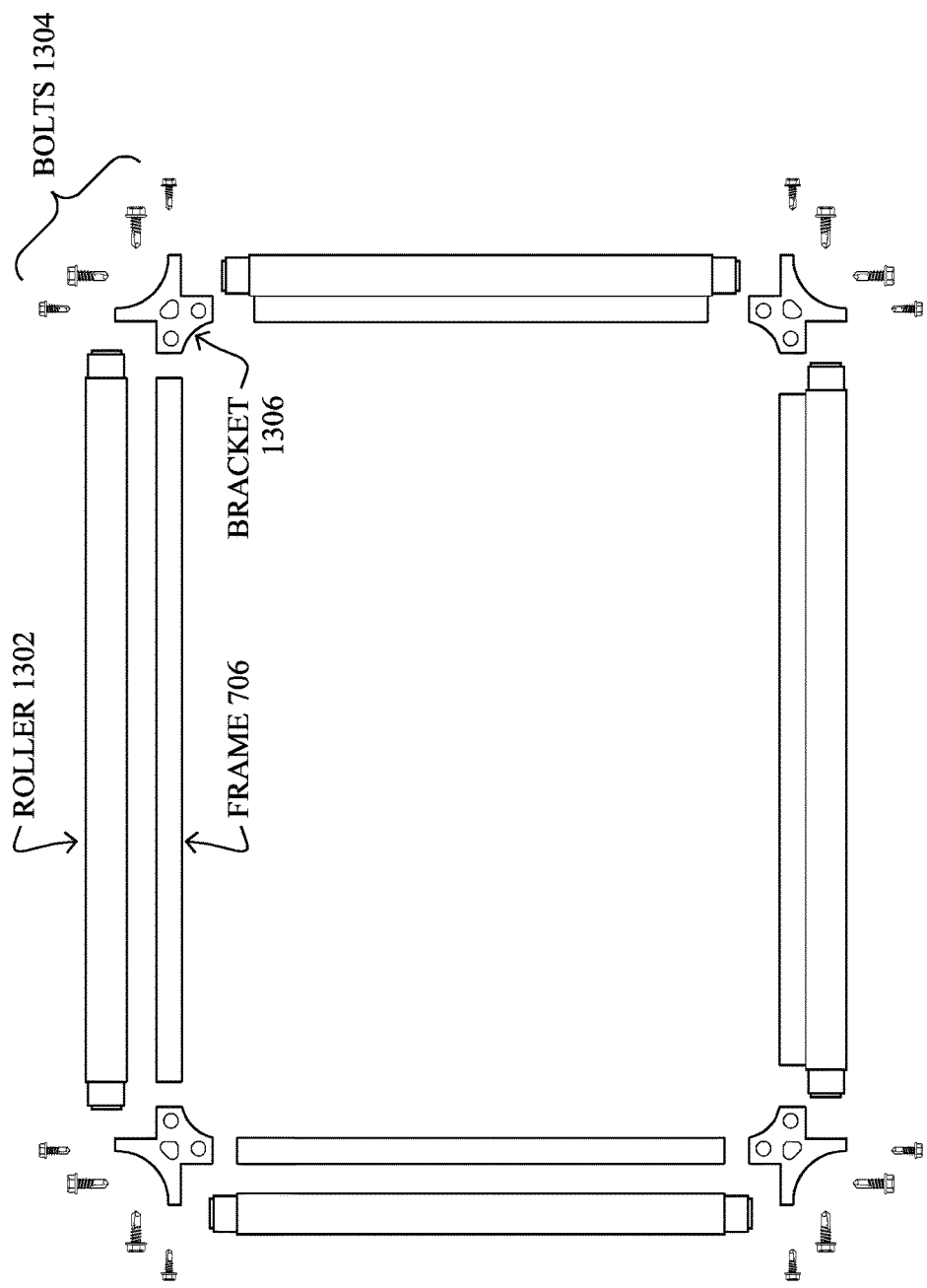
FIGS. 13A-13D illustrate an example of a roller-based foil tensioning system for Pepper's Ghost Illusion in accordance with one or more embodiments herein.
Figure 13B:
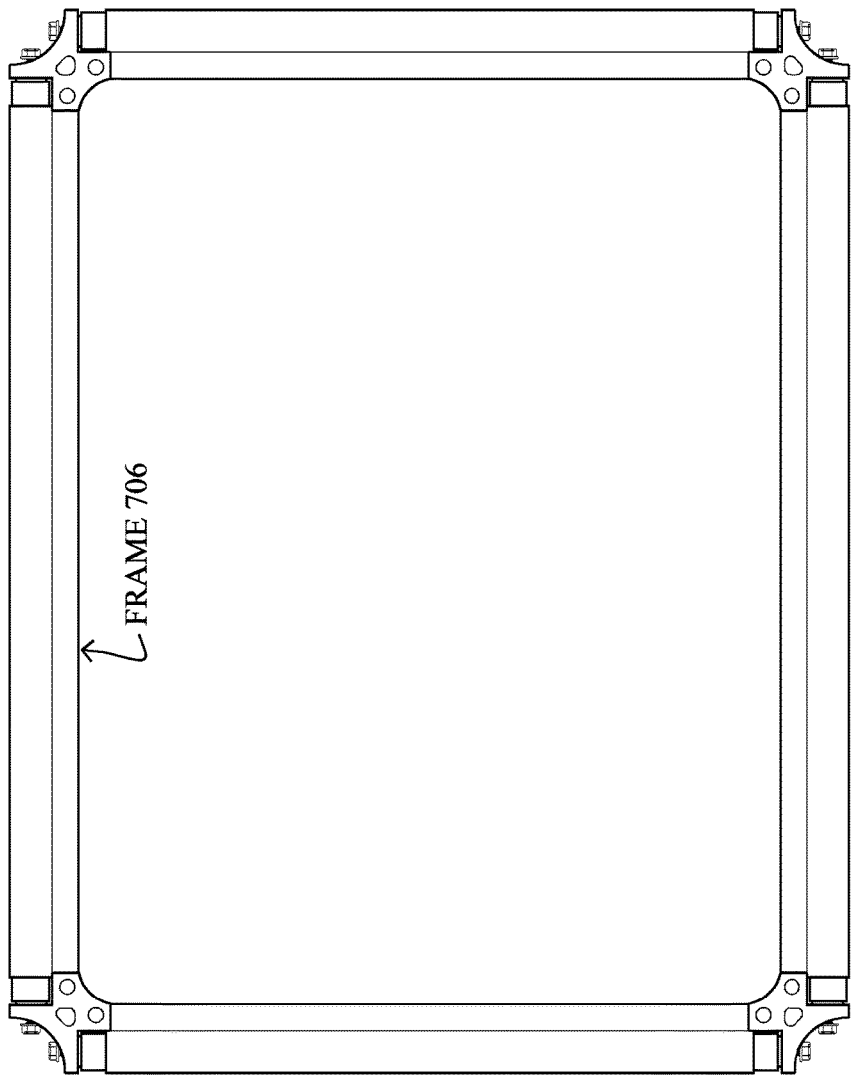
Figure 13C:
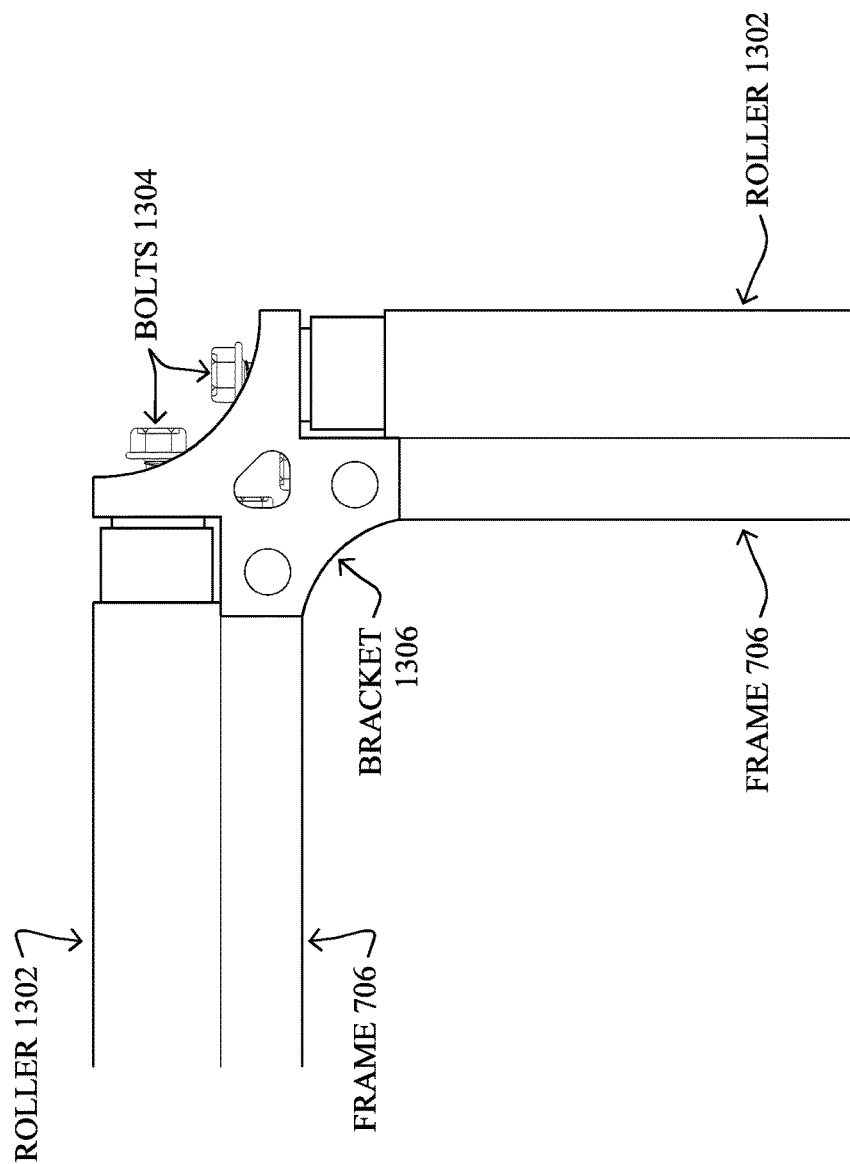
Figure 13D:
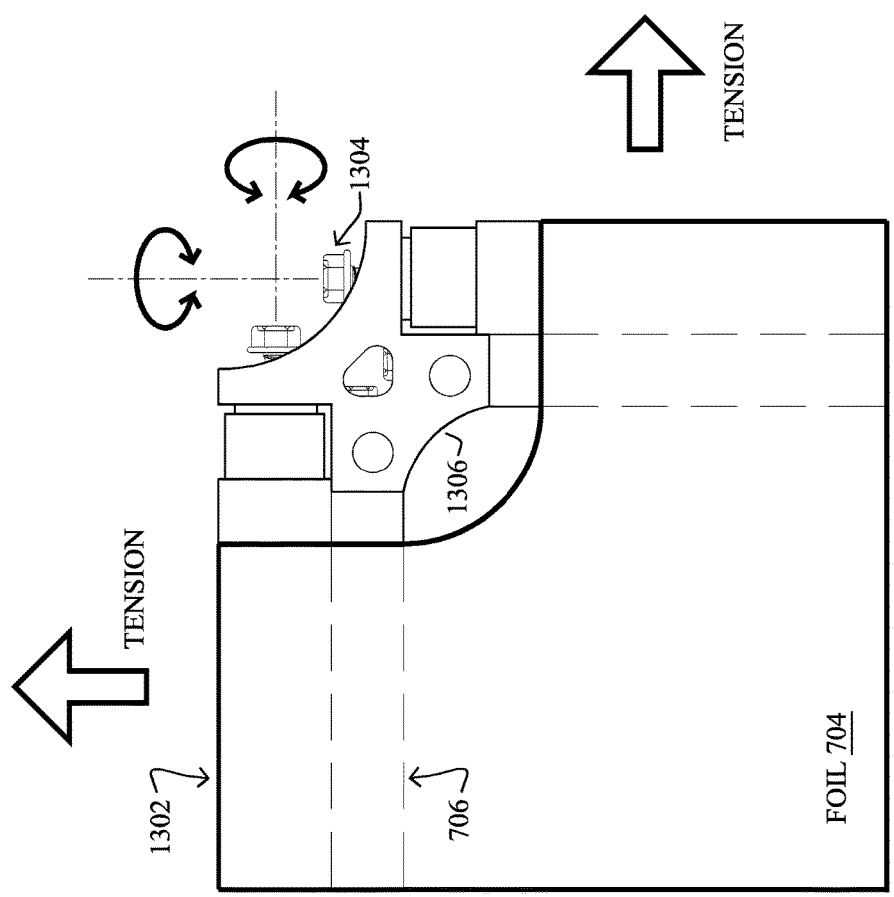

In particular, FIGS. 13A-13D illustrate various views of a roller-based foil tensioning system in accordance with one or more embodiments herein (e.g., exploded in FIG. 13A, together in FIG. 13B, and a corner close-up in FIG. 13C). Each side of the box frame 706 may have a stationary portion and a roller portion 1302, where the stationary portions are affixed to one another in the corners through the use of a specially designed bracket 1306. The rollers 1302 are connected to the brackets 1306 as well, and can independently roll in any rotational direction. Note that as described above, the rollers may comprise the groove (e.g., groove 708) into which the foil 704 is secured. The sides of the frame, i.e., rollers 1306, to which the holographic foil 704 is secured, may then roll outwards, as shown in FIG. 13D, adding tension to the frame in each direction. The rollers in their tensioning positions may then be fixed (e.g., bolted using bolts 1304, ratcheted, latched, etc.) in place, therefore tightening the foil material.

Figure 14:
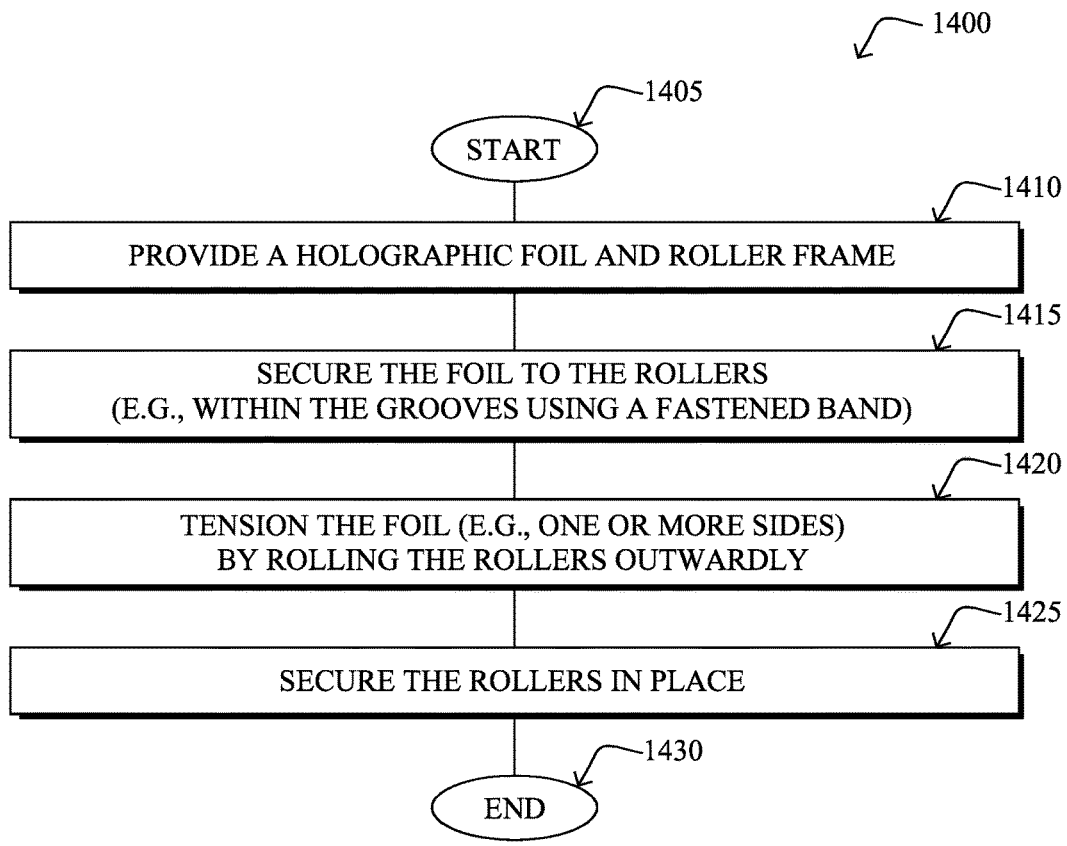
FIG. 14 illustrates an example procedure for using a roller-based foil tensioning system for Pepper's Ghost Illusion in accordance with one or more embodiments herein.

FIG. 14 illustrates an example simplified procedure for using a roller-based foil tensioning system for Pepper's Ghost Illusion in accordance with one or more embodiments described herein. The simplified procedure 1400 may start at step 1405, and continues to step 1410, where a holographic foil and roller frame are provided. Then, based on any of the specific embodiments above, the foil may be secured to the rollers (e.g., within the grooves using a fastening band) in step 1415. In step 1420, the foil may be tensioned (e.g., one or more sides) by rolling the rollers outwardly, and then the rollers may be secured in place in step 1425. The simplified procedure ends with the tensioned foil in step 1430.

It should be noted that while certain steps within procedure 1400 may be optional as described above, the steps shown in FIG. 14 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Advantageously, the techniques herein provide for a roller-based foil tensioning system for Pepper's Ghost Illusion. In particular, as mentioned above, the techniques described herein secure a holographic foil to a roller system on one or more sides in a manner that allows tightening the holographic screen material. For example, the techniques herein alleviate the cumbersome nature associated with current tensioning methods for holographic foils, which are large and can only tension two parallel sides of the foil (where the techniques above can tension two or four sides). Additionally, the techniques herein greatly increase the amount of tension on the foil, alleviating vibration issues (e.g., due to HVAC, sound, etc.) seen in existing tensioning methods. Moreover, the tensioning system herein also has a thin profile, which allows it to be installed in a variety of locations that are not possible with existing methods due to their size and weight.

—Frame-Based Foil Tensioning System for Pepper's Ghost Illusion—

According to the present invention, in particular, a frame-based foil tensioning system for Pepper's Ghost Illusion is specifically described herein that provides for a holographic foil to be secured to a frame system on two or four sides, stretched outwards by expansion of the frame's size (e.g., by a screw jack system), and are then fixed (e.g., bolted) in place, therefore tightening the holographic screen material. (Note that the above-mentioned foil-securing techniques are not meant to be limiting to the scope of the present invention, and other foil-securing techniques may be used in conjunction with the tensioning system described below.)

Figure 15A:
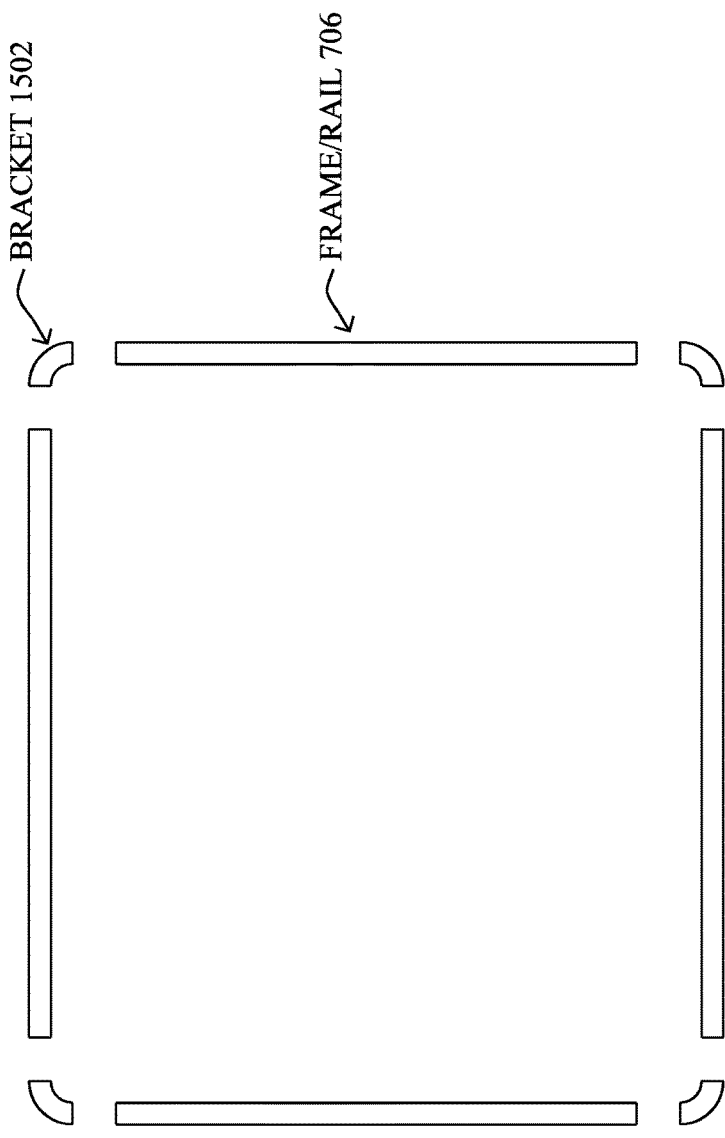
FIGS. 15A-15B illustrate an example of a frame-based foil tensioning system for Pepper's Ghost Illusion in accordance with one or more embodiments herein.
Figure 15B:
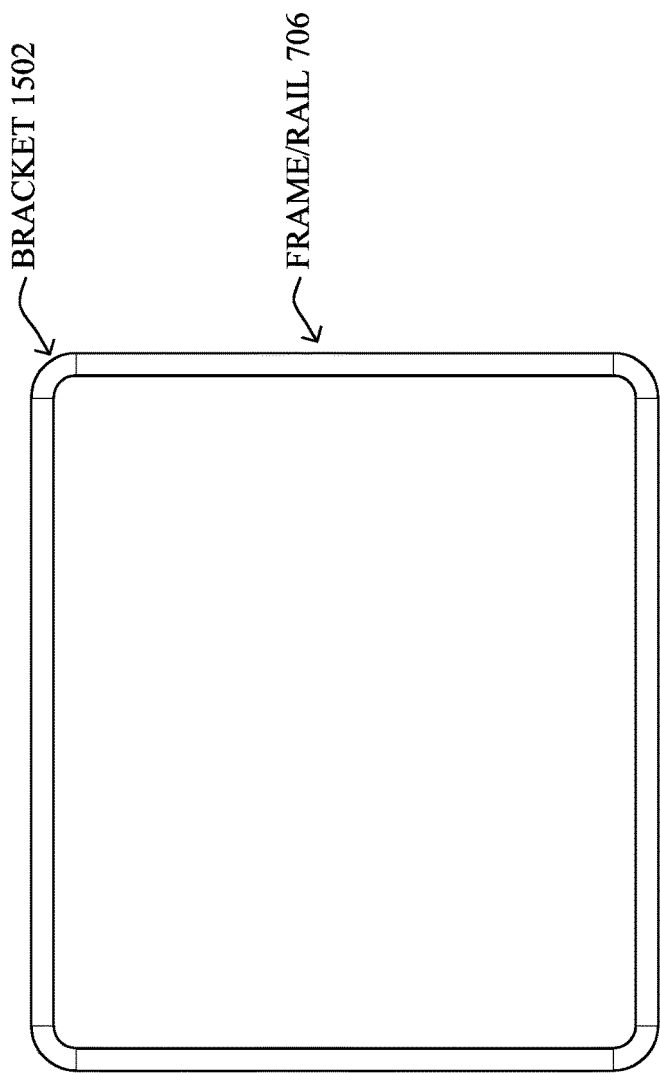

In particular, FIGS. 15A-15B illustrate various views of an illustrative frame-based foil tensioning system in accordance with one or more embodiments herein (e.g., exploded in FIG. 15A and together in FIG. 15B). Each side of the box frame 706 may have a generally straight tube or rail "frame portion" (e.g., an extruded or otherwise formed material, such as aluminum, steel, etc.), where the frame portions are affixed to one another in the corners through the use of a specially designed bracket 1502. Note that as described above, the frame portions may comprise the groove 708 into which the foil 704 is secured.

Figure 16A:
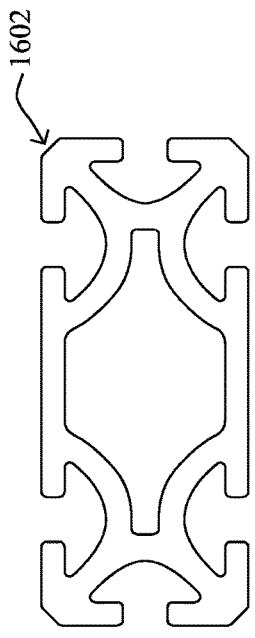

FIGS. 16A-16E illustrate specific components of the frame-based foil tensioning system in accordance with one or more embodiments herein. In particular, FIG. 16A illustrates an example side-view of the frame portion 1602, which notably has a plurality of grooves or channels (e.g., two on each of the top and bottom, and one on each side). It should be noted that the number and placement of the grooves shown should not be limited to the scope of the present invention. In general, as described above, only one groove 708 (or other securing mechanism) need be used for the foil 704, but in order to more easily allow for universality of the frame pieces (i.e., ensuring there is no single "top" or "bottom" during assembly), a more symmetrical design may be used, with the use of the additional grooves being described below.

Figure 16B:
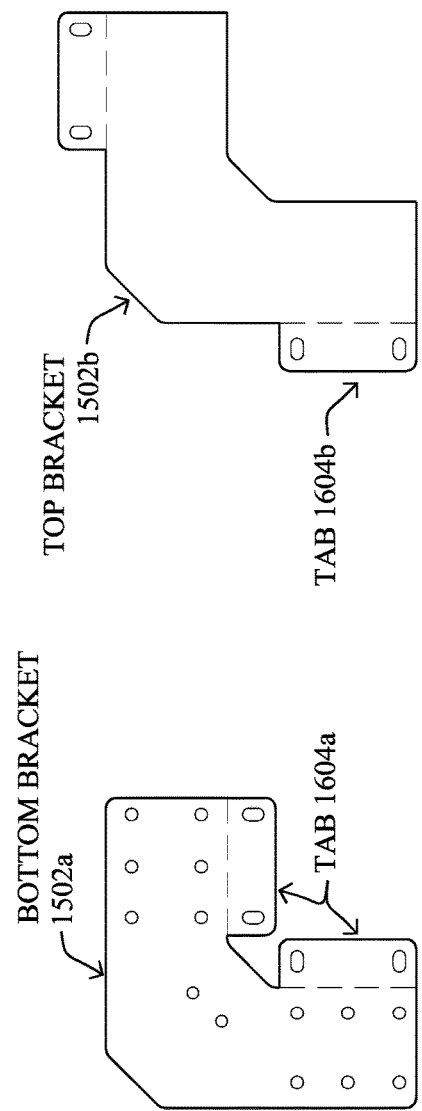
Figure 16C:
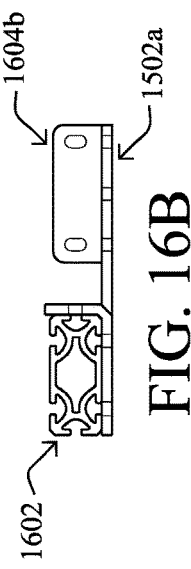

FIGS. 16B-16C illustrates an example close-up view of the brackets that may be used on each corner of the box frame. In particular, though only one bracket piece need be used (e.g., the "bottom" bracket 1502*a*), for added stability and/or looks, a "top" bracket 1502*b* may also be used. Also, tabs 1604 or flanges on the brackets 1502 may help for added stability, but they are not necessary.

FIG. 16D illustrates a channel-locking system that may be used in conjunction with the brackets 1502 and the grooves 708 on the frame portions. In particular, the channel-locks 1606 may slide into the ends of a groove, and may have threads or threaded studs that allow for securing the channel-locks 1606 in place. That is, as described above, the channel-locks 1606 may slidingly engage the frame's grooves 708, and may be secured in place through one or more fastening mechanisms (e.g., bolts, nuts, screws, etc.).

Lastly, FIG. 16E illustrates a side view of a corner bracket 1502 assembled ("bottom" bracket 1502*a* only), showing how the foil 704 may be secured to the frame 706, and how the bracket 1608 may be secured to the frame as well (e.g., using fasteners 1610).

Figure 17A:
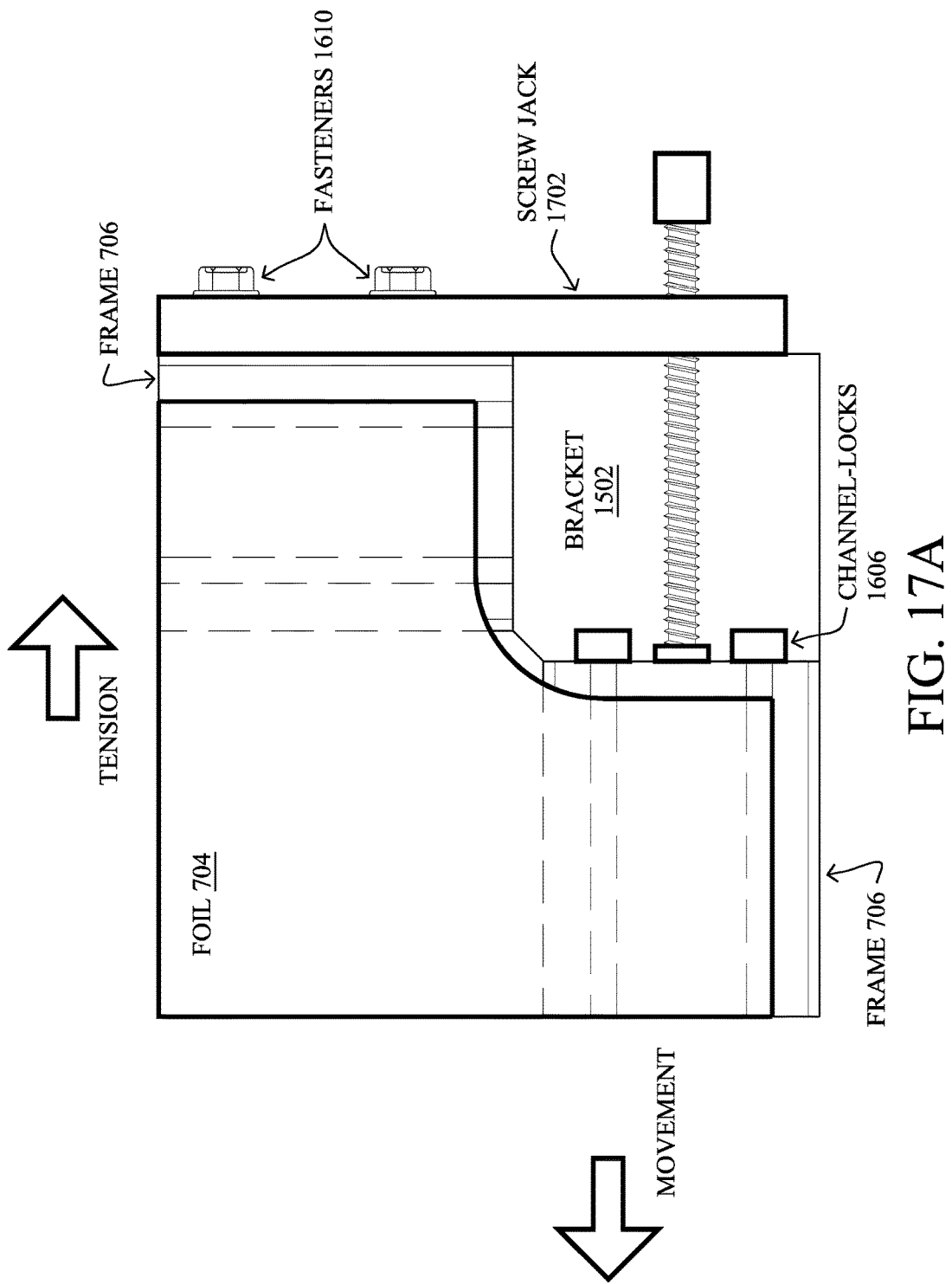
FIGS. 17A-17B illustrate an example of using a frame-based foil tensioning system for Pepper's Ghost Illusion in accordance with one or more embodiments herein.
Figure 17B:
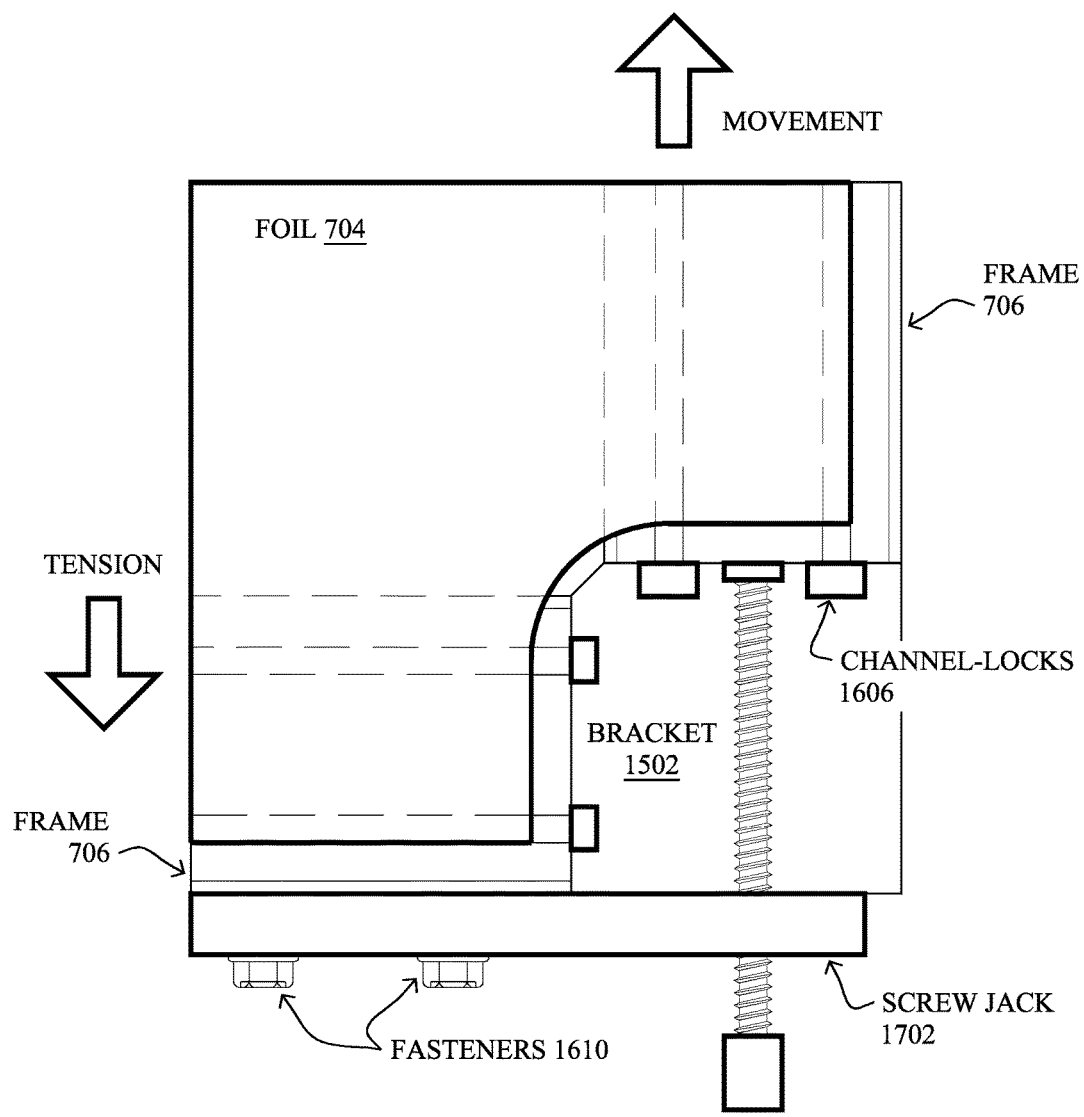

The sides of the frame 706, i.e., the frame portions, to which the holographic foil 704 is secured, may be pushed (or pulled) outwards, as shown in FIGS. 17A-17B (a first direction and second direction, respectively), adding tension to the frame 706 in each direction. For instance, the channel-lock mechanisms 1606 may slide within the grooves 708 of the frame portions (that is, the frame moves, as the channel-lock stays in position on the bracket), as an illustrative screw-jack 1702 spreads the corner apart, generally one direction at a time, to expand the frame's overall size. The frame portions in their tensioning positions may then be fixed (e.g., bolted, latched, etc.) in place by the brackets 1502, such as by tightening/securing the channel-lock mechanisms 1606 in place, therefore tightening the foil material.

Figure 18:
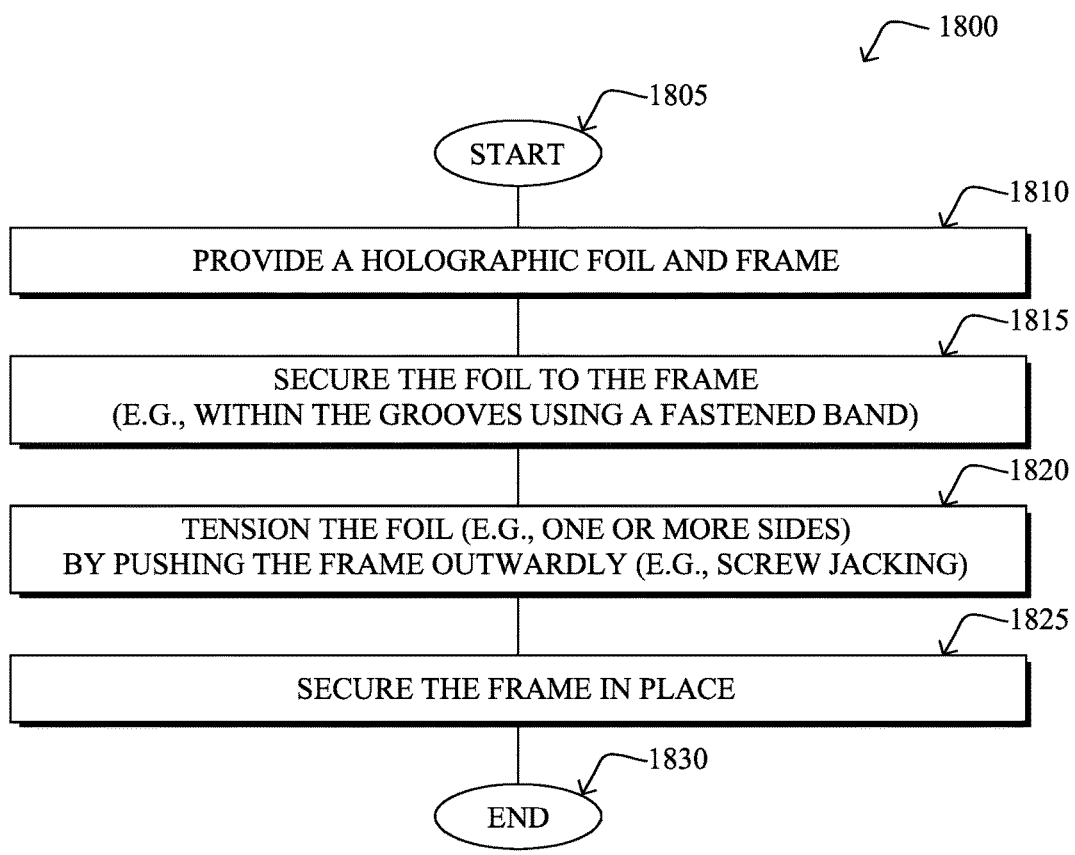
FIG. 18 illustrates an example procedure for using a frame-based foil tensioning system for Pepper's Ghost Illusion in accordance with one or more embodiments herein.

FIG. 18 illustrates an example simplified procedure for using a frame-based foil tensioning system for Pepper's Ghost Illusion in accordance with one or more embodiments described herein. The simplified procedure 1800 may start at step 1805, and continues to step 1810, where a holographic foil and frame are provided. Then, based on any of the specific embodiments above, the foil may be secured to the frame (e.g., within the grooves using a fastening band) in step 1815. In step 1820, the foil may be tensioned (e.g., one or more sides) by pushing the frame outwardly (e.g., screw-jacking), and then the frame may be secured in place in step 1825. The simplified procedure ends with the tensioned foil in step 1830.

It should be noted that while certain steps within procedure 1800 may be optional as described above, the steps shown in FIG. 18 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Advantageously, the techniques herein provide for a frame-based foil tensioning system for Pepper's Ghost Illusion. In particular, as mentioned above, the techniques described herein secure a holographic foil to a frame system on one or more sides in a manner that allows tightening the holographic screen material. For example, the techniques herein alleviate the cumbersome nature associated with current tensioning methods for holographic foils, which are large and can only tension two parallel sides of the foil (where the techniques above can tension two or four sides). Additionally, the techniques herein greatly increase the amount of tension on the foil, alleviating vibration issues (e.g., due to HVAC, sound, etc.) seen in existing tensioning methods. Moreover, the tensioning system herein also has a thin profile, which allows it to be installed in a variety of locations that are not possible with existing methods due to their size and weight.

While there have been shown and described illustrative embodiments, it is to be understood that various other adaptations and modifications may be made within the spirit and scope of the embodiments herein. For example, the embodiments described herein may be used with holographic projection images produced from a variety of sources, such as live-streamed, pre-recorded, re-constructed, computer-generated, and so on. Also, any reference to "video" or "image" or "picture" need not limit the embodiments to whether they are motion or time-sequence photography or still images, etc. Moreover, any holographic imagery techniques may be used herein, and the illustrations provided above are merely example embodiments, whether for two-dimensional or three-dimensional holographic images.

Further, the embodiments herein may generally be performed in connection with one or more computing devices (e.g., personal computers, laptops, servers, specifically configured computers, cloud-based computing devices, cameras, etc.), which may be interconnected via various local and/or network connections. Various actions described herein may be related specifically to one or more of the devices, though any reference to particular type of device herein is not meant to limit the scope of the embodiments herein.

The foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
securing a holographic foil to a roller-frame system on two or more opposing sides of the roller-frame system, at least one side of the roller-frame system comprising a stationary frame portion and a roller, wherein the roller comprises a groove and the foil is secured in the groove of the roller, wherein the stationary frame portions are connected by a bracket at corners of the roller-frame system;
rolling the roller of the at least one side of the roller-frame system while the holographic foil is secured thereto, thereby tightening the holographic foil; and
fixing the at least one rolled side of the roller-frame system in place while the holographic foil is tightened.

2. The method as in claim 1, wherein the foil is secured in the groove with a fastening means.

3. The method as in claim 2, wherein the fastening means are selected from a group consisting of: bands; snaps; loops and a rod; and two rods with a foil loop.

4. The method as in claim 1, wherein securing comprises: placing the holographic foil over top of the groove; and pushing a fastening band into the groove on top of the foil along one side until the foil is secured.

5. The method as in claim 1, wherein securing comprises: cutting the holographic foil to a proper size for the roller-frame system; securing a fastening band onto edges of the cut holographic foil; and snapping the edges of the holographic foil into the grooves.

6. The method as in claim 5, wherein securing the fastening band comprises gluing or heat bonding.

7. The method as in claim 1, wherein securing comprises: cutting the holographic foil to a proper size for the roller-frame system; forming loops at edges of the cut holographic foil; and inserting a locking rod through the loops, the locking rod configured to rest within the grooves to secure the holographic foil to the frame.

8. The method as in claim 7, wherein forming loops comprises folding the foil over and securing it to itself.

9. The method as in claim 7, wherein inserting the locking rod comprises: threading the locking rod through the loops as the loops are already within the grooves.

10. The method as in claim 7, wherein inserting the locking rod comprises: placing a compressible locking rod through the loops, and then compressing the compressible locking rod into the grooves to lock the foil in place.

11. The method as in claim 1, wherein securing comprises: securing the foil with one locking rod with extra foil on the outside, looping the extra foil back over, and inserting a second rod into the groove creating a loop in the foil, causing reverse forces on the material to hold it in place while the foil is tensioned.

12. The method as in claim 1, wherein the holographic foil is secured to the roller-frame system on two sets of opposing sides of the roller-frame system, wherein each set of opposing sides comprises a stationary frame portion and a roller and each roller comprises a groove into which the foil is secured.

13. The method of claim 1, wherein the roller is connected by the bracket at the corner of the roller-frame system.

* * * * *